US012448448B2

(12) United States Patent
Cornfeld et al.

(10) Patent No.: US 12,448,448 B2
(45) Date of Patent: Oct. 21, 2025

(54) ANTI-PD-1 ANTIBODIES AND USES THEREOF

(71) Applicants: Incyte Corporation, Wilmington, DE (US); MacroGenics, Inc., Rockville, MD (US)

(72) Inventors: Mark Cornfeld, Philadelphia, PA (US); Naimish Bharat Pandya, Rockville, MD (US); Jon Marc Wigginton, Rockville, MD (US); Ross La Motte-Mohs, Rockville, MD (US); Bradley James Sumrow, Rockville, MD (US)

(73) Assignees: Incyte Corporation, Wilmington, DE (US); MacroGenics, Inc., Rockville, MD (US)

( * ) Notice: Subject to any disclaimer, the term of this patent is extended or adjusted under 35 U.S.C. 154(b) by 700 days.

(21) Appl. No.: 16/444,691

(22) Filed: Jun. 18, 2019

(65) Prior Publication Data
US 2020/0095322 A1 Mar. 26, 2020

Related U.S. Application Data

(60) Provisional application No. 62/756,319, filed on Nov. 6, 2018, provisional application No. 62/687,673, filed on Jun. 20, 2018.

(51) Int. Cl.
| | | |
|---|---|---|
| *C07K 16/28* | (2006.01) | |
| *A61K 9/00* | (2006.01) | |
| *A61K 39/00* | (2006.01) | |
| *A61P 35/00* | (2006.01) | |
| *A61P 35/04* | (2006.01) | |

(52) U.S. Cl.
CPC ........ *C07K 16/2818* (2013.01); *A61K 9/0019* (2013.01); *A61P 35/00* (2018.01); *A61P 35/04* (2018.01); *A61K 2039/505* (2013.01); *A61K 2039/545* (2013.01); *C07K 2317/24* (2013.01); *C07K 2317/565* (2013.01)

(58) Field of Classification Search
CPC ............ C07K 16/2818; C07K 2317/24; C07K 2317/565; A61K 9/0019; A61K 2039/505; A61K 2039/545; A61P 35/00; A61P 35/04
See application file for complete search history.

(56) References Cited

U.S. PATENT DOCUMENTS

| | | | |
|---|---|---|---|
| 4,399,216 A | 8/1983 | Axel et al. |
| 4,634,665 A | 1/1987 | Axel et al. |
| 5,057,313 A | 10/1991 | Shih et al. |
| 5,156,840 A | 10/1992 | Goers et al. |
| 5,179,017 A | 1/1993 | Axel et al. |
| 5,530,101 A | 6/1996 | Queen et al. |
| 5,585,089 A | 12/1996 | Queen et al. |
| 5,624,821 A | 4/1997 | Winter et al. |
| 5,648,260 A | 7/1997 | Winter et al. |
| 5,693,761 A | 12/1997 | Queen et al. |
| 5,693,762 A | 12/1997 | Queen et al. |
| 5,714,350 A | 2/1998 | Co et al. |
| 5,731,168 A | 3/1998 | Carter et al. |
| 5,849,992 A | 12/1998 | Meade et al. |
| 5,859,205 A | 1/1999 | Adair et al. |
| 5,869,046 A | 2/1999 | Presta et al. |
| 6,300,064 B1 | 10/2001 | Knappik et al. |
| 6,350,861 B1 | 2/2002 | Co et al. |
| 6,407,213 B1 | 6/2002 | Carter et al. |
| 6,803,192 B1 | 10/2004 | Chen |
| 6,808,710 B1 | 10/2004 | Wood et al. |
| 7,029,674 B2 | 4/2006 | Carreno et al. |
| 7,101,550 B2 | 9/2006 | Wood et al. |
| 7,488,802 B2 | 2/2009 | Collins et al. |
| 7,563,869 B2 | 7/2009 | Honjo et al. |
| 7,595,048 B2 | 9/2009 | Honjo et al. |
| 7,635,757 B2 | 12/2009 | Freeman et al. |
| 7,722,868 B2 | 5/2010 | Freeman et al. |
| 7,794,710 B2 | 9/2010 | Chen et al. |
| 7,851,598 B2 | 12/2010 | Davis |
| 8,008,449 B2 | 8/2011 | Korman et al. |
| 8,168,757 B2 | 5/2012 | Finnefrock et al. |
| 8,287,856 B2 | 10/2012 | Li et al. |
| 8,354,509 B2 | 1/2013 | Carven et al. |
| 8,460,886 B2 | 6/2013 | Shibayama et al. |
| 8,709,416 B2 | 4/2014 | Langermann et al. |
| 8,735,553 B1 | 5/2014 | Li et al. |
| 8,927,697 B2 | 1/2015 | Davis et al. |
| 8,993,731 B2 | 3/2015 | Tyson |
| 9,102,727 B2 | 8/2015 | Freeman et al. |

(Continued)

FOREIGN PATENT DOCUMENTS

| | | |
|---|---|---|
| CN | 105960415 | 9/2016 |
| EP | 0404097 | 12/1990 |

(Continued)

OTHER PUBLICATIONS

MacroGenics_2016_RnD_Day_-_FINAL_website_download_.pdf, accessed May 17, 2021 from http:/web.archive.org/web/20210517161118/http://ir.macrogenics.com/static-files/a35326eb-2be4-4859-837e-bb0b4f3a7da0 (Year: 2016).*
Medlineplus, MSH6 Gene, https://medlineplus.gov/genetics/gene/msh6/, accessed May 19, 2021 (Year: 2020).*
Ott PA, Piha-Paul SA, Munster P, et al. Safety and antitumor activity of the anti-PD-1 antibody pembrolizumab in patients with recurrent carcinoma of the anal canal. Ann Oncol. 2017;28(5):1036-1041. (Year: 2017).*
Chan IS et al. Journal for Immuno Therapy of Cancer (2018) 6:23 1-6 (Year: 2018).*
Doherty K et al. Retifanlimab Adds FDA-Approved Option to Merkel Cell Carcinoma Treatment Landscape. (OncLive Mar. 14, 2025 https://www.onclive.com/view/retifanlimab-adds-fda-approved-option-to-merkel-cell-carcinoma-treatment-landscape). (Year: 2025).*

(Continued)

*Primary Examiner* — Karen A. Canella
*Assistant Examiner* — John J Skoko, III
(74) *Attorney, Agent, or Firm* — Fish & Richardson P.C.

(57) ABSTRACT

Methods of treatment of cancer with antibodies and antibody fragments that bind to PD-1 are disclosed.

6 Claims, No Drawings

Specification includes a Sequence Listing.

(56) References Cited

U.S. PATENT DOCUMENTS

| | | | |
|---|---|---|---|
| 9,102,728 B2 | 8/2015 | Tyson | |
| 9,132,281 B2 | 9/2015 | Zeng et al. | |
| 9,205,148 B2 | 12/2015 | Langermann et al. | |
| 9,217,034 B2 | 12/2015 | Li et al. | |
| 9,220,776 B2 | 12/2015 | Sharma et al. | |
| 9,243,052 B2 | 1/2016 | Olive et al. | |
| 9,534,052 B2 | 1/2017 | Eisenbach-Schwartz et al. | |
| 9,598,491 B2 | 3/2017 | Ahmed et al. | |
| 9,637,546 B2 | 5/2017 | Olive et al. | |
| 9,676,853 B2 | 6/2017 | Zhou et al. | |
| 9,683,048 B2 | 6/2017 | Freeman et al. | |
| 9,701,749 B2 | 7/2017 | Shibayama et al. | |
| 10,577,422 B2 | 3/2020 | Shah et al. | |
| 11,623,959 B2 | 4/2023 | Shah et al. | |
| 2005/0008625 A1 | 1/2005 | Balint et al. | |
| 2005/0037000 A1 | 2/2005 | Stavenhagen et al. | |
| 2005/0059051 A1 | 3/2005 | Chen | |
| 2005/0079574 A1 | 4/2005 | Bond | |
| 2007/0202100 A1 | 8/2007 | Wood et al. | |
| 2008/0311117 A1 | 12/2008 | Collins et al. | |
| 2009/0055944 A1 | 2/2009 | Korman et al. | |
| 2009/0110667 A1 | 4/2009 | Mozaffarian et al. | |
| 2009/0274666 A1 | 11/2009 | Chen | |
| 2009/0313687 A1 | 12/2009 | Popp et al. | |
| 2012/0114651 A1 | 5/2012 | De Wildt et al. | |
| 2012/0251537 A1 | 10/2012 | Ahmed et al. | |
| 2012/0269806 A1 | 10/2012 | Sykes | |
| 2014/0234331 A1 | 8/2014 | Korman et al. | |
| 2015/0125463 A1 | 5/2015 | Cogswell et al. | |
| 2015/0203579 A1 | 7/2015 | Papadopoulos et al. | |
| 2015/0299322 A1 | 10/2015 | Freeman et al. | |
| 2015/0344577 A1 | 12/2015 | Fu | |
| 2016/0158360 A1* | 6/2016 | Hernandez | A61K 45/06 424/135.1 |
| 2016/0159905 A1 | 6/2016 | Abdiche et al. | |
| 2016/0222113 A1 | 8/2016 | Buchanan et al. | |
| 2016/0251436 A1 | 9/2016 | Amirina et al. | |
| 2016/0272708 A1 | 9/2016 | Chen | |
| 2016/0319019 A1 | 11/2016 | Amirina et al. | |
| 2016/0347836 A1 | 12/2016 | Grosso | |
| 2016/0362492 A1 | 12/2016 | Freeman et al. | |
| 2016/0376367 A1 | 12/2016 | Yuan et al. | |
| 2017/0044259 A1 | 2/2017 | Tipton et al. | |
| 2017/0044260 A1 | 2/2017 | Baruah et al. | |
| 2017/0081409 A1 | 3/2017 | Dijk et al. | |
| 2017/0088618 A1 | 3/2017 | Bennett et al. | |
| 2017/0121409 A1 | 5/2017 | Verona et al. | |
| 2017/0165325 A1 | 6/2017 | Sharpe et al. | |
| 2017/0198037 A1 | 7/2017 | Bovini et al. | |
| 2017/0210806 A1 | 7/2017 | Liu | |
| 2017/0226182 A1 | 8/2017 | Chomont et al. | |
| 2019/0127467 A1 | 5/2019 | Shah et al. | |
| 2022/0233529 A1 | 7/2022 | Wang et al. | |

FOREIGN PATENT DOCUMENTS

| | | | |
|---|---|---|---|
| WO | WO 90/07861 | 7/1990 | |
| WO | WO 93/11161 | 6/1993 | |
| WO | WO 01/14557 | 3/2001 | |
| WO | WO 01/39722 | 6/2001 | |
| WO | WO 02/086083 | 10/2002 | |
| WO | WO 2005/003175 | 1/2005 | |
| WO | WO 2005/018572 | 3/2005 | |
| WO | WO 2013/181452 | 12/2013 | |
| WO | WO 2014/074852 | 5/2014 | |
| WO | WO 2014/179664 | 11/2014 | |
| WO | WO 2015/058573 | 4/2015 | |
| WO | WO 2015/195163 | 12/2015 | |
| WO | WO 2016/014688 | 1/2016 | |
| WO | WO 2016/020856 | 2/2016 | |
| WO | WO 2016/057933 | 4/2016 | |
| WO | WO 2016/068801 | 5/2016 | |
| WO | WO 2016/077397 | 5/2016 | |
| WO | WO 2016/191751 | 12/2016 | |
| WO | WO 2016/197497 | 12/2016 | |
| WO | WO 2016/201051 | 12/2016 | |
| WO | WO 2017/016497 | 2/2017 | |
| WO | WO 2017/019846 | 2/2017 | |
| WO | WO 2017/019896 | 2/2017 | |
| WO | WO 2017/024515 | 2/2017 | |
| WO | WO 2017/025051 | 2/2017 | |
| WO | WO-2017019846 A1 * | 2/2017 | ............... A61P 1/04 |
| WO | WO 2017/054646 | 4/2017 | |
| WO | WO 2017/055443 | 4/2017 | |
| WO | WO 2017/055547 | 4/2017 | |
| WO | WO 2017/058115 | 4/2017 | |
| WO | WO 2017/062619 | 4/2017 | |
| WO | WO 2017/071625 | 5/2017 | |
| WO | WO 2017/087599 | 5/2017 | |
| WO | WO 2017/096026 | 6/2017 | |
| WO | WO 2017/106061 | 6/2017 | |
| WO | WO 2017/106656 | 6/2017 | |
| WO | WO 2017/107885 | 6/2017 | |
| WO | WO 2017/124050 | 7/2017 | |

OTHER PUBLICATIONS

Fojnica A et al. An Updated Review of the Biomarkers of Response to Immune Checkpoint Inhibitors in Merkel Cell Carcinoma: Merkel Cell Carcinoma and Immunotherapy. (Cancers 2023, 15(20), 5084) (Year: 2023).*

International Preliminary Report on Patentability in International Application No. PCT/US2019/037750, dated Dec. 22, 2020, 13 pages.

Agata et al., "Expression Of The PD-I Antigen On The Surface Of Stimulated Mouse T And B Lymphocytes," Int Immunol., 1996, 8(5):765-772.

Angal et al., "A single amino acid substitution abolishes the heterogeneity of chimeric mouse/human (IgG4) antibody," Mol Immunol., 1993, 30(1):105-108.

Berge, et al. "Pharmaceutical Salts," J Pharm Sci., 1977, 66:1-19.

Better et al., "*Escherichia coli* secretion of an active chimeric antibody fragment," Science, 1988, 240:1041-1043.

Better et al., "Expression of engineered antibodies and antibody fragments in microorganisms," Methods in Enzymology, 1989, 178:476-496.

Bird et al., "Single chain antibody variable regions," TIBTECH, 1991, 9:132-137.

Blank et al., "Contribution Of The PD-L1/PD-1 Pathway To T-Cell Exhaustion: An Update On Implications For Chronic Infections And Tumor Evasion Cancer," Immunol Immunother., 2006, 56(5):739-745.

Boyd, "Some practical considerations and applications of the national cancer institute in vitro anticancer drug discovery screen," Drug Development Research, Feb. 1995, 34(2):91-109.

Carter et al., "High level *Escherichia coli* expression and production of a bivalent humanized antibody fragment," Bio/Technology, 1992, 10(2):163-167.

Carter et al., "Humanization of an anti-p185HER2 antibody for human cancer therapy," PNAS., May 15, 1992, 89(10):4285-4289.

Chothia et al., "Structural repertoire of the human VH segments," J Mal Bio., 1992, 227:799-817.

Co et al., "A humanized antibody specific for the platelet integrin gpIIb/IIIa," J Immunol., Mar. 15, 1994, 152(6):2968-2976 (Abstract Only).

Cook et al., "The human immunoglobulin VH repertoire," Immunol Today., 1995, 16(5):237-242.

Davies et al., "Single antibody domains as small recognition units: design and in vitro antigen selection of camelized, human VH domains with improved protein stability," Protein Eng., 1996, 9(6):531-537.

Dizon et al., "Complete Remission Following Pembrolizumab in a Woman with Mismatch Repair-Deficient Endometrial Cancer and a Germline BRCA1 Mutation," The Oncol., Feb. 22, 2018, 23(6):650-653.

Dorai et al., "Aglycosylated Chimeric Mouse/Human IgG1 Antibody Retains Some Effector Function," Hybridoma, Apr. 1991, 10(2):211-217.

(56) References Cited

OTHER PUBLICATIONS

Flies et al., "The New B7s: Playing a Pivotal Role in Tumor Immunity" J Immunother., Apr. 2007, 30(3):251-260.
Friend, "Phase I Study of an Engineered Aglycosylated Humanized CD3 Antibody in Renal Transplant Rejection," Transplantation, Dec. 15, 1999, 68(11):1632-1637.
Genbank Accession No. NP_005009, Mar. 29, 2020, 5 pages.
Gennaro, "Remington: The Science and Practice of Pharmacy," Lippincott, Williams & Wilkins, 2000, 20th ed., 1053 pages.
Graddis et al., "Designing Proteins That Work Using Recombinant Technologies ," Curr Pharm Biotechnol., 2002 3(4):285-297.
Hand et al., "Comparative biological properties of a recombinant chimeric anti-carcinoma mAb and a recombinant aglycosylated variant," Cancer Immunol Immunother., 1992, 35(3):165-174.
Harmsen et al., "Properties, production, and applications of camelid single-domain antibody fragments," Appl Microbial Biotechnol., Aug. 18, 2007, 77(1):13-22.
Hobbs et al., "Interaction of aglycosyl immunoglobulins with the IgG Fc transport receptor from neonatal rat gut: Comparison of deglycosylation by tunicamycin treatment and genetic engineering," Mol Immunol., 1992, 29(7-8):949-956.
Holliger et al., "'Diabodies': small bivalent and bispecific antibody fragments," Proc Natl Acad Sci USA., 1993, 90(14):6444-6448.
Hudson, et al., "High avidity scFv multimers; diabodies and triabodies," J Immunol Methods., Dec. 10, 1999, 231(1-2):177-189.
Huston et al., "Protein engineering of antibody binding sites: recovery of specific activity in an anti-digoxin single-chain Fv analogue produced in *Escherichia coli*," Proc. Natl. Acad Sci. US. A., Aug. 1, 1988, 85:5879-5883.
International Invitation to Pay Fees in International Application No. PCT/US2019/037750, dated Oct. 10, 2019, 19 pages.
International Search Report and Written Opinion in International Application No. PCT/US2019/037750, dated Dec. 4, 2019, 22 pages.
Isaacs, "Therapy with monoclonal antibodies. An in vivo model for the assessment of therapeutic potential.," J Immunol., May 15, 1992, 148(10):3062-3071.
Ishida et al., "Induced Expression Of Pd-I, A Novel Member Of The Immunoglobulin Gene Superfamily, Upon Programmed Cell Death," EMBO J., 1992, 11(11):3887-3895.
Kaufman and Sharp "Amplification and expression of sequences cotransfected with a modular dihydrofolate reductase complementary dna gene.," Mol Biol., Aug. 1982, 159(4):601-621.
Lamoyi, E., "Preparation of F(ab')2 fragments from mouse IgG of various subclasses," Methods in Enzymology, 1986 121:652-663.
Leatherbarrow and Dwek, "The effect of aglycosylation on the binding of mouse IgG to staphylococcal protein A," Febs Letters, Dec. 12, 1983, 164(2):227-230.
Leatherbarrow et al., "Effector functions of a monoclonal aglycosylated mouse IgG2a: binding and activation of complement component C1 and interaction with human monocyte Fc receptor.," Mol Immunol., 1985, 22(4):407-415.
Lei et al., "Characterization of the Erwinia carotovora pelB gene and its product pectate lyase," J Bacterial., Sep. 1987, 169:4379-4383.
Makker et al., "New therapies for advanced, recurrent, and metastatic endometrial cancers," Gynecol Oncol Res Pract., Dec. 2, 2017, 4:19.
Martin-Orozco et al., "Inhibitory Costimulation And Anti Tumor Immunity" Semin. Cancer Biol., 2007, 17(4):288-298.
Mehnert et al., "Immune activation and response to pembrolizumab in POLE-mutant endometrial cancer," J Clin Invest., Jun. 1, 2016, 126(6):2334-2340.
Milstein et al., "Hybrid hybridomas and their use in immunohistochemistry," Nature, Oct. 6, 1983, 305:537-540.
Mizushima et al., "pEF-BOS, a powerful mammalian expression vector," Nucleic Acids Res., Sep. 11, 1990, 18:5322.
Moller et al., "Intracellular activation of interferon regulatory factor-1 by nanobodies to the multifunctional (Mf1) domain," J Biol. Chem., Dec. 3, 2010, 285(49):38348-38361.
Morrison, "Transfectomas provide novel chimeric antibodies," Science, Sep. 20, 1985, 229(4719):1202-1207.
Mulligan et al., "Synthesis of rabbit beta-globin in cultured monkey kidney cells following infection with a SV40 beta-globin recombinant genome," Nature, Jan. 11, 1979, 277(5692):108-114.
Nishimura et al., "Facilitation Of Beta Selection And Modification Of Positive Selection In The Thymus Of PD-I-Deficient Mice" J Exp Med., Mar. 6, 2000, 191(5):891-898.
Nose and Wigzell, "Biological significance of carbohydrate chains on monoclonal antibodies," Proc Natl Acad Sci USA., Nov. 1983, 80(21):6632-6636.
Ott et al., "Safety and Antitumor Activity of Pembrolizumab in Advanced Programmed Death Ligand 1-Positive Endometrial Cancer: Results From the KEYNOTE-028 Study," J Clin Oncol., Aug. 1, 2017, 35(22):2535-2541.
Powers et al., "Expression of single-chain Fv-Fc fusions in Pichia pastoris," J Immunol Methods, May 1, 2001, 251(1-2):123-135.
Raju, "Glycosylation variations with expression systems," BioProcess International, Apr. 2003, pp. 44-53.
Rousseaux et al., "Optimal conditions for the preparation of proteolytic fragments from monoclonal IgG of different rat IgG subclasses," Methods in Enzymology, 1986, 121:663-669.
Santin et al., "Regression of Chemotherapy-Resistant Polymerase & (POLE) Ultra-Mutated and MSH6 Hyper-Mutated Endometrial Tumors with Nivolumab," Clin Canc Res., Dec. 1, 2016, 22(23):5682-5687.
Shields et al., "High resolution mapping of the binding site on human IgG1 for Fc gamma RI, Fc gamma RII, Fc gamma RIII, and FcRn and design of IgG1 variants with improved binding to the Fc gamma R," J Biol Chem. 2001, 276(9):6591-6604.
Shields et al., "Lack of fucose on human IgG1 N-linked oligosaccharide improves binding to human Fcgamma RIII and antibody-dependent cellular toxicity," *J Biol Chem.*, *Jul. 26, 2002*, 277(30):26733-26740.
Shinkawa et al., "The absence of fucose but not the presence of galactose or bisecting N-acetylglucosamine of human IgG1 complex-type oligosaccharides shows the critical role of enhancing antibody-dependent cellular cytotoxicity," J Biol Chem., Jan. 31, 2003, 278(5):3466-3473.
Tao et al., "Studies of aglycosylated chimeric mouse-human IgG. Role of carbohydrate in the structure and effector functions mediated by the human IgG constant region," J Immunol., Oct. 15, 1989, 143(8):2595-2601 (Abstract Only).
Tempest et al., "Reshaping a human monoclonal antibody to inhibit human respiratory syncytial virus infection in vivo," Biotechnology, Mar. 1991, 9(3):266-271.
Tomlinson et al., "The repertoire of human germline vH sequences reveals about fifty groups of VH segments with different hypervariable loops," J Mal Biol., Oct. 5, 1992, 227:776-798.
Tomlinson et al., "The structural repertoire of the human V kappa domain," EMBO J, Sep. 15, 1995, 14(18):4628-4638.
Tomlinson et al., "V Base: The database fof human antibody genes," MRC Centre for Protein Engineering, Cambridge, UK, 1997 [retrieved on Oct. 30, 2020], retrieved from URL <https://www2.mrc-lmb.cam.ac.uk/vbase/vbase-intro2.php>, 3 pages.
Umana et al., "Engineered glycoforms of an antineuroblastoma IgG1 with optimized antibody-dependent cellular cytotoxic activity," Nat Biotechnol., Feb. 1999, 17(2):176-180.
Urlaub and Chasin "Isolation of Chinese hamster cell mutants deficient in dihydrofolate reductase activity," Proc Natl Acad Sci., Jul. 1, 1980, 77(7):4216-4220.
Ward and Ghetie, "The effector functions of immunoglobulins: implications for therapy," Therapeutic Immunology, Apr. 1995, 2(2):77-94 (Abstract Only).
Ward et al., "Binding activities of a repertoire of single immunoglobulin variable domains secreted from *Escherichia coli*," Nature, Oct. 12, 1989, 341(6242):544-546.
Wright & Morrison, "Effect of glycosylation on antibody function: implications for genetic engineering," Trends in Biotech., Jan. 1997, 15(1):26-32.
Yamazaki et al., "Expression Of Programmed Death I Ligands By Murine T-Cells And APC" J Immunol., Nov. 15, 2002, 169(10):5538-5545.

(56) References Cited

OTHER PUBLICATIONS

Gibney et al., "Abstract P313: INCMGA 0012-201: A Phase 2 Study of INCMGA00012 in Patients with Metastatic Merkel Cell Carcinoma," Poster, Presented at 33rd Annual Meeting of the Society for Immunotherapy of Cancer, Nov. 7-11, 2018, Washington, D.C., 1 page.
Lakhani et al., "Abstract P249: A Phase 1 Study of the Safety, Tolerability, and Pharmacokinetics (PK) of MGA012 (anti-PD-1 antibody) in Patients with Advanced Solid Tumors," Poster, Presented Society for Immunotherapy of Cancer (SITC) 32nd Annual Maeeting, Nov. 8-12, 2017, National Harbor MD, 1 pages.
Mehnert et al., "Abstract 669: First-in-Human Phase 1 Study of INCMGA00012 in Patients With Advanced Solid Tumors: Interim Results of the Cohort Expansion Phase," Poster, Presented at the 33rd Annual Meeting of the Society for Immunotherapy of Cancer, Nov. 7-11, 2018, Washington D.C., 1 page.
Rao et al., "Abstract P336: An International, Single-Arm, Phase 2 Study of INCMGA00012 in Patients with Advanced Squamous Carcinoma of the Anal Canal (SCAC) Who Have Progressed Following Platinum-Based Chemotherapy (NCT03597295)," Poster, Presented at the 33rd Annual Meeting of the Society for the Immunotherapy of Cancer, Nov. 7-11, 2018, Washington D.C., 1 page.
Nghiem et al., "PD-1 Blockade with Pembrolizumab in Advanced Merkel-Cell Carcinoma," N Engl J Med., Jun. 30, 2016, 374(26):2542-2552.
Extended European Search Report in European Application No. 24151431.4, dated May 23, 2024, 12 pages.
Morris et al., "Nivolumab for previously treated unresectable metastatic anal cancer (NCI9673): a multicentre, single-arm, phase 2 study," The Lancet Oncology, Apr. 2017, 18(4):446-453.
Sclafani et al., "Systemic therapies for advanced squamous cell anal cancer," Current oncology reports, Jul. 2018, 20(53):1-11.
Topalian et al., "Abstract CT074: Non-comparative, open-label, multiple cohort, phase 1/2 study to evaluate nivolumab (NIVO) in patients with virus-associated tumors (CheckMate 358): Efficacy and safety in Merkel cell carcinoma (MCC)," Cancer Research, Jul. 2017, 77(13_Supplement):CT074 Abstract, 4 pages.
Walocko et al., "Metastatic Merkel cell carcinoma response to nivolumab," Journal for ImmunoTherapy of Cancer, Dec. 2016, 4(79):1-4.
Winkler et al., "PD-1 blockade: a therapeutic option for treatment of metastatic Merkel cell carcinoma," British Journal of Dermatology, Jan. 2017, 176(1):216-219.
Barroso-Sousa et al., "PD-1 inhibitors in endometrial cancer," Oncotarget, Nov. 21, 2017, 8(63):106169-106170.
Bai et al., "A guide to rational dosing of monoclonal antibodies," Clinical Pharmacokinetics, Feb. 1, 2012, 51(2):119-135.
Chen et al., "Abstract LB-268: Assessment of flat dosing strategy for INCMGA00012 in patients with advanced tumors," Poster, Presented at Proceedings of the American Association for Cancer Research Annual Meeting 2019, Atlanta, GA, Mar. 29-Apr. 3, 2019; Cancer Research, 2019, 79(13 Suppl): 4 pages.
Committee for Medicinal Products for Human Use (CHMP), "Withdrawal assessment report: Zynyz, International non-proprietary name: retifanlimab," Procedure No. EMEA/H/C/005632/0000, European Medicines Agency, Jun. 24, 2021, 116 pages.
Freshwater et al., "Evaluation of dosing strategy for pembrolizumab for oncology indications," Journal for ImmunoTherapy of Cancer, May 16, 2017, 5:43, 16 pages.
Rao et al., "A phase II study of retifanlimab (INCMGA00012) in patients with squamous carcinoma of the anal canal who have progressed following platinum-based chemotherapy (POD1UM-202)," ESMO Open, Aug. 2022, 7(4):100529, 10 pages.
Wang et al., "Fixed dosing versus body size-based dosing of monoclonal antibodies in adult clinical trials," Journal of Clinical Pharmacology, Sep. 2009, 49(9): 1012-1024.
Zhang et al., "Fixed dosing versus body size-based dosing of therapeutic peptides and proteins in adults," Journal of Clinical Pharmacology, Jan. 2012, 52(1):18-28.
Zhao et al., "Assessment of nivolumab benefit-risk profile of a 240-mg flat dose relative to a 3-mg/kg dosing regimen in patients with advanced tumors," Annals of Oncology, Aug. 1, 2017, 28:2002-2008.

* cited by examiner

ANTI-PD-1 ANTIBODIES AND USES THEREOF

CROSS-REFERENCE TO RELATED APPLICATIONS

This application claims priority to U.S. Provisional Appl. No. 62/687,673, filed Jun. 20, 2018, and U.S. Provisional Appl. No. 62/756,319, filed Nov. 6, 2018. The content of the prior applications are incorporated by reference herein in their entirety.

SEQUENCE LISTING

The instant application contains a Sequence Listing which has been submitted electronically in ASCII format and is hereby incorporated by reference in its entirety. Said ASCII copy, created on Nov. 14, 2019, is named Sequence_Listing.txt and is 12.4 KB in size.

BACKGROUND

Some patients with cancer, including endometrial cancer, Merkel cell carcinoma, and anal cancer, have a poor long term prognosis. Additional and newer treatments are necessary for these cancers, especially for those patients that develop metastatic disease.

SUMMARY

In one aspect, the disclosure features a method of treating an endometrial cancer (e.g., metastatic endometrial cancer) in a human subject in need thereof, the method comprising administering to the human subject a therapeutically effective amount of an antibody or antigen-binding fragment thereof that binds to human PD-1, wherein the antibody or antigen-binding fragment thereof comprises a variable heavy (VH) domain comprising VH complementarity determining region (CDR)1, VH CDR2, and VH CDR3, wherein:
    the VH CDR1 comprises the amino acid sequence SYWMN (SEQ ID NO:6);
    the VH CDR2 comprises the amino acid sequence VIHPSDSETWLDQKFKD (SEQ ID NO:7); and
    the VH CDR3 comprises the amino acid sequence EHYGTSPFAY (SEQ ID NO:8); and
    wherein the antibody comprises a variable light (VL) domain comprising VL CDR1, VL CDR2, and VL CDR3, wherein:
    the VL CDR1 comprises the amino acid sequence RASESVDNYGMSFMNW (SEQ ID NO:9);
    the VL CDR2 comprises the amino acid sequence AASNQGS (SEQ ID NO:10); and
    the VL CDR3 comprises the amino acid sequence QQSKEVPYT (SEQ ID NO:11).
In some embodiments, the endometrial cancer is microsatellite instability-high (MSI-H) endometrial cancer (e.g., metastatic MSI-H endometrial cancer).
In some embodiments, the endometrial cancer is mismatch repair deficient (dMMR) endometrial cancer (e.g., metastatic dMMR endometrial cancer).
In some embodiments, the endometrial cancer is DNA polymerase c (POLE) exonuclease domain mutation positive endometrial cancer (e.g., metastatic POLE exonuclease domain mutation positive endometrial cancer).
In another aspect, the disclosure features a method of treating Merkel cell carcinoma (e.g., metastatic Merkel cell carcinoma) in a human subject in need thereof, the method comprising administering to the human subject a therapeutically effective amount of an antibody or antigen-binding fragment thereof that binds to human PD-1, wherein the antibody or antigen-binding fragment thereof comprises a VH domain comprising VH CDR1, VH CDR2, and VH CDR3, wherein:
    the VH CDR1 comprises the amino acid sequence SYWMN (SEQ ID NO:6);
    the VH CDR2 comprises the amino acid sequence VIHPSDSETWLDQKFKD (SEQ ID NO:7); and
    the VH CDR3 comprises the amino acid sequence EHYGTSPFAY (SEQ ID NO:8); and
    wherein the antibody comprises a VL domain comprising VL CDR1, VL CDR2, and VL CDR3, wherein:
    the VL CDR1 comprises the amino acid sequence RASESVDNYGMSFMNW (SEQ ID NO:9);
    the VL CDR2 comprises the amino acid sequence AASNQGS (SEQ ID NO:10); and
    the VL CDR3 comprises the amino acid sequence QQSKEVPYT (SEQ ID NO:11).
In another aspect, the disclosure features a method of treating anal cancer (e.g., metastatic anal cancer) in a human subject in need thereof, the method comprising administering to the human subject a therapeutically effective amount of an antibody or antigen-binding fragment thereof that binds to human PD-1, wherein the antibody or antigen-binding fragment thereof comprises a VH domain comprising VH CDR1, VH CDR2, and VH CDR3, wherein:
    the VH CDR1 comprises the amino acid sequence SYWMN (SEQ ID NO:6);
    the VH CDR2 comprises the amino acid sequence VIHPSDSETWLDQKFKD (SEQ ID NO:7); and
    the VH CDR3 comprises the amino acid sequence EHYGTSPFAY (SEQ ID NO:8); and
    wherein the antibody comprises a VL domain comprising VL CDR1, VL CDR2, and VL CDR3, wherein:
    the VL CDR1 comprises the amino acid sequence RASESVDNYGMSFMNW (SEQ ID NO:9);
    the VL CDR2 comprises the amino acid sequence AASNQGS (SEQ ID NO:10); and
    the VL CDR3 comprises the amino acid sequence QQSKEVPYT (SEQ ID NO:11).
In some embodiments, the anal cancer is squamous cell carcinoma of the anal canal (SCAC) (e.g., metastatic SCAC).
In some embodiments of any of the above aspects, the antibody or antigen-binding fragment is administered at a dose of about 1 mg/kg once every 2 weeks.
In some embodiments of any of the above aspects, the antibody or antigen-binding fragment is administered at a dose of about 3 mg/kg once every 2 weeks.
In some embodiments of any of the above aspects, the antibody or antigen-binding fragment is administered at a dose of about 3 mg/kg once every 4 weeks.
In some embodiments of any of the above aspects, the antibody or antigen-binding fragment is administered at a dose of about 10 mg/kg once every 2 weeks.
In some embodiments of any of the above aspects, the antibody or antigen-binding fragment is administered at a dose of about 10 mg/kg once every 4 weeks.
In another aspect, the disclosure features a method of treating a cancer in a human subject in need thereof, the method comprising administering to the human subject a therapeutically effective fixed dose of an antibody or antigen-binding fragment thereof that binds to human PD-1, wherein the antibody or antigen-binding fragment thereof comprises a VH domain comprising VH CDR1, VH CDR2, and VH CDR3, wherein:
   the VH CDR1 comprises the amino acid sequence SYWMN (SEQ ID NO:6);
   the VH CDR2 comprises the amino acid sequence VIHPSDSETWLDQKFKD (SEQ ID NO:7); and
   the VH CDR3 comprises the amino acid sequence EHYGTSPFAY (SEQ ID NO:8); and
wherein the antibody comprises a VL domain comprising VL CDR1, VL CDR2, and VL CDR3, wherein:
   the VL CDR1 comprises the amino acid sequence RASESVDNYGMSFMNW (SEQ ID NO:9);
   the VL CDR2 comprises the amino acid sequence AASNQGS (SEQ ID NO:10); and
   the VL CDR3 comprises the amino acid sequence QQSKEVPYT (SEQ ID NO:11).

In some embodiments of such methods of treating a cancer comprising administering a therapeutically effective fixed dose, the cancer is anal cancer, bladder cancer, breast cancer, colorectal cancer, endometrial cancer, hepatocellular carcinoma, glioma, kidney cancer, lung cancer, Merkel cell carcinoma, multiple myeloma, neuroblastoma, non-Hodgkin's lymphoma, non-small cell lung cancer, ovarian cancer, pancreatic cancer, rectal cancer, or sarcoma.

In some embodiments of such methods of treating a cancer comprising administering a therapeutically effective fixed dose, the cancer is endometrial cancer (e.g., unselected endometrial, MSI-high endometrial cancer, dMMR endometrial cancer, or POLE exonuclease domain mutation positive endometrial cancer), soft tissue sarcoma, non-small cell lung cancer (NSCLC), or cervical cancer.

In some embodiments of any of the above aspects, the antibody or antigen-binding fragment is administered at a fixed dose of about 375 mg once every 3 weeks.

In some embodiments of any of the above aspects, the antibody or antigen-binding fragment is administered at a fixed dose of about 500 mg once every 4 weeks.

In some embodiments of any of the above aspects, the antibody or antigen-binding fragment is administered at a fixed dose of about 750 mg once every 4 weeks.

In some embodiments of any of the above aspects, the VH domain comprises the amino acid sequence set forth in SEQ ID NO:4.

In some embodiments of any of the above aspects, the antibody comprises a heavy chain and wherein the heavy chain comprises the amino acid sequence set forth in SEQ ID NO:2.

In some embodiments of any of the above aspects, the VL domain comprises the amino acid sequence set forth in SEQ ID NO:5.

In some embodiments of any of the above aspects, the antibody comprises a light chain and wherein the light chain comprises the amino acid sequence set forth in SEQ ID NO:3.

In some embodiments of any of the above aspects, the VH domain comprises the amino acid sequence set forth in SEQ ID NO:4 and the VL domain comprises the amino acid sequence set forth in SEQ ID NO:5.

In some embodiments of any of the above aspects, the antibody comprises a heavy chain and a light chain, and wherein the heavy chain comprises the amino acid sequence set forth in SEQ ID NO:2 and the light chain comprises the amino acid sequence set forth in SEQ ID NO:3.

In some embodiments of any of the above aspects, the antibody is a humanized antibody.

In some embodiments of any of the above aspects, the antigen-binding fragment is a single chain antibody, an Fab fragment, an F(ab')2 fragment, an Fab' fragment, an Fsc fragment, an Fv fragment, an scFv, an sc(Fv)2, or a diabody.

In some embodiments of any of the above aspects, the antibody or antigen-binding fragment is administered intravenously.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the exemplary methods and materials are described below. All publications, patent applications, patents, and other references mentioned herein are incorporated by reference in their entirety. In case of conflict, the present application, including definitions, will control. The materials, methods, and examples are illustrative only and not intended to be limiting.

Other features and advantages of the invention will be apparent from the following detailed description, and from the claims.

DETAILED DESCRIPTION

The anti-PD-1 antibodies described herein can be used to treat endometrial cancer, Merkel cell carcinoma, and anal cancer.

PD-1

Programmed Death-1 ("PD-1," also known as "CD279") is an approximately 31 kD type I membrane protein member of the extended CD28/CTLA-4 family of T-cell regulators that broadly negatively regulates immune responses (Ishida, Y. et al. (1992) "Induced Expression Of PD-1, A Novel Member Of The Immunoglobulin Gene Superfamily, Upon Programmed Cell Death" EMBO J. 11:3887-3895; United States Patent Application Publication No. 2007/0202100; 2008/0311117; 2009/00110667; U.S. Pat. Nos. 6,808,710; 7,101,550; 7,488,802; 7,635,757; 7,722,868; PCT Publication No. WO 01/14557).

PD-1 is expressed on activated T-cells, B-cells, and monocytes (Agata, Y. et al. (1996) "Expression Of The PD-1 Antigen On The Surface Of Stimulated Mouse T And B Lymphocytes," Int. Immunol. 8(5):765-772; Yamazaki, T. et al. (2002) "Expression Of Programmed Death 1 Ligands By Murine T-Cells And APC" J. Immunol. 169:5538-5545) and at low levels in natural killer (NK) T-cells (Nishimura, H. et al. (2000) "Facilitation Of Beta Selection And Modification Of Positive Selection In The Thymus Of PD-1-Deficient Mice" J. Exp. Med. 191:891-898; Martin-Orozco, N. et al. (2007) "Inhibitory Costimulation And Anti-Tumor Immunity" Semin. Cancer Biol. 17(4):288-298).

The extracellular region of PD-1 consists of a single immunoglobulin (Ig)V domain with 23% identity to the equivalent domain in CTLA-4 (Martin-Orozco, N. et al. (2007) "Inhibitory Costimulation And Anti-Tumor Immunity" Semin. Cancer Biol. 17(4):288-298). The extracellular IgV domain is followed by a transmembrane region and an intracellular tail. The intracellular tail contains two phosphorylation sites located in an immunoreceptor tyrosine-based inhibitory motif and an immunoreceptor tyrosine-based switch motif, which suggests that PD-1 negatively regulates TCR signals (Ishida, Y. et al. (1992) "Induced Expression Of PD-1, A Novel Member Of The Immunoglobulin Gene Superfamily, Upon Programmed Cell Death," EMBO J. 11:3887-3895; Blank, C. et al. (2006) "Contribution Of The PD-L1/PD-1 Pathway To T-C ell Exhaustion: An Update On Implications For Chronic Infections And Tumor Evasion Cancer," Immunol. Immunother. 56(5):739-745).

PD-1 mediates its inhibition of the immune system by binding to B7-H1 and B7-DC (Flies, D. B. et al. (2007) "The New B7s: Playing a Pivotal Role in Tumor Immunity" J. Immunother. 30(3):251-260; U.S. Pat. Nos. 6,803,192; 7,794,710; United States Patent Application Publication Nos. 2005/0059051; 2009/0055944; 2009/0274666; 2009/0313687; PCT Publication Nos. WO 01/39722; WO 02/086083).

The amino acid sequence of the human PD-1 protein (Genbank Accession No. NP_005009) is:

```
                                        (SEQ ID NO: 1)
MQIPQAPWPVVWAVLQLGWRPGWFLDSPDRPWNPPTFSPALLVVTEGDNA

TFTCSFSNTSESFVLNWYRMSPSNQTDKLAAFPEDRSQPGQDCRFRVTQL

PNGRDFHMSVVRARRNDSGTYLCGAISLAPKAQIKESLRAELRVTERRAE

VPTARPSPSPRPAGQFQTLVVGVVGGLLGSLVLLVWVLAVICSRAARGTI

GARRTGQPLKEDPSAVPVFSVDYGELDFQWREKTPEPPVPCVPEQTEYAT

IVFPSGMGTSSPARRGSADGPRSAQPLRPEDGHCSWPL.
```

Anti-PD-1 Antibodies

This disclosure includes the sequences of a monoclonal antibody, ANTIBODY X, a humanized, IgG4 monoclonal antibody that binds to human PD-1. See hPD-1 mAb 7 (1.2) in WO2017019846 and US 2019/0127467, the content of which is incorporated by reference. The amino acid sequences of the mature ANTIBODY X heavy and light chains are shown below. Complementarity-determining regions (CDRs) 1, 2, and 3 of the variable heavy (VH) domain and the variable light (VL) domain are shown in that order from N to the C-terminus of the mature VL and VH sequences and are both underlined and boldened. An antibody consisting of the mature heavy chain (SEQ ID NO:2) and the mature light chain (SEQ ID NO:3) listed below is termed ANTIBODY X.

```
Mature ANTIBODY X heavy chain (HC)
                                        (SEQ ID NO: 2)
QVQLVQSGAEVKKPGASVKVSCKASGYSFTSYWMNWVRQAPGQGLEWIGV

IHPSDSETWLDQKFKDRVTITVDKSTSTAYMELSSLRSEDTAVYYCAREH

YGTSPFAYWGQGTLVTVSSASTKGPSVFPLAPCSRSTSESTAALGCLVKD

YFPEPVTVSWNSGALTSGVHTFPAVLQSSGLYSLSSVVTVPSSSLGTKTY

TCNVDHKPSNTKVDKRVESKYGPPCPPCPAPEFLGGPSVFLFPPKPKDTL

MISRTPEVTCVVVDVSQEDPEVQFNWYVDGVEVHNAKTKPREEQFNSTYR

VVSVLTVLHQDWLNGKEYKCKVSNKGLPSSIEKTISKAKGQPREPQVYTL

PPSQEEMTKNQVSLTCLVKGFYPSDIAVEWESNGQPENNYKTTPPVLDSD

GSFFLYSRLTVDKSRWQEGNVFSCSVMHEALHNHYTQKSLS

LSLG

Mature ANTIBODY X light chain (LC)
                                        (SEQ ID NO: 3)
EIVLTQSPATLSLSPGERATLSCRASESVDNYGMSFMNWFQQKPGQPPKL

LIHAASNQGSGVPSRFSGSGSGTDFTLTISSLEPEDFAVYFCQQSKEVPY

TFGGGTKVEIKRTVAAPSVFIFPPSDEQLKSGTASVVCLLNNFYPREAKV

QWKVDNALQSGNSQESVTEQDSKDSTYSLSSTLTLSKADYEKHKVYACEV

THQGLSSPVTKSFNRGEC
```

The variable heavy (VH) domain of ANTIBODY X has the following amino acid sequence:

```
                                        (SEQ ID NO: 4)
QVQLVQSGAEVKKPGASVKVSCKASGYSFTSYWMNWVRQAPGQGLEWIGV

IHPSDSETWLDQKFKDRVTITVDKSTSTAYMELSSLRSEDTAVYYCAREH

YGTSPFAYWGQGTLVTVSS
```

The variable light (VL) domain of ANTIBODY X has the following amino acid sequence:

```
                                        (SEQ ID NO: 5)
EIVLTQSPATLSLSPGERATLSCRASESVDNYGMSFMNWFQQKPGQPPKL

LIHAASNQGSGVPSRFSGSGSGTDFTLTISSLEPEDFAVYFCQQSKEVPY

TFGGGTKVEIK
```

The amino acid sequences of the VH CDRs of ANTIBODY X are listed below:

```
VH CDR1:   SYWMN;              (SEQ ID NO: 6)

VH CDR2:   VIHPSDSETWLDQKFKD;  (SEQ ID NO: 7)

VH CDR3:   EHYGTSPFAY          (SEQ ID NO: 8)
```

The amino acid sequences of VL CDRs of ANTIBODY X are listed below:

```
VL CDR1:   RASESVDNYGMSFMNW;   (SEQ ID NO: 9)

VL CDR2:   AASNQGS;            (SEQ ID NO: 10)
and
VL CDR3:   QQSKEVPYT.          (SEQ ID NO: 11)
```

In certain embodiments, the anti-PD-1 antibodies include a human heavy chain and light chain constant region. In certain embodiments, the heavy chain constant region comprises a CH1 domain and a hinge region. In some embodiments, the heavy chain constant region comprises a CH2 domain. In some embodiments, the heavy chain constant region comprises a CH3 domain. In some embodiments, the heavy chain constant region comprises CH1, CH2 and CH3 domains. If the heavy chain constant region includes substitutions, such substitutions modify the properties of the antibody (e.g., increase or decrease one or more of: Fc receptor binding, antibody glycosylation, the number of cysteine residues, effector cell function, or complement function). In certain embodiments, the antibody is an IgG antibody. In specific embodiments, the antibody is selected from the group consisting of IgG1, IgG2, IgG3, and IgG4.

Antibodies, such as ANTIBODY X, can be made, for example, by preparing and expressing synthetic genes that encode the recited amino acid sequences or by mutating human germline genes to provide a gene that encodes the recited amino acid sequences. Moreover, this antibody and other anti-PD-1 antibodies can be obtained, e.g., using one or more of the following methods.

Humanized antibodies can be generated by replacing sequences of the Fv variable region that are not directly involved in antigen binding with equivalent sequences from human Fv variable regions. General methods for generating humanized antibodies are provided by Morrison, S. L., *Science*, 229:1202-1207 (1985), by Oi et al., *BioTechniques*, 4:214 (1986), and by U.S. Pat. Nos. 5,585,089; 5,693,761; 5,693,762; 5,859,205; and 6,407,213. Those methods include isolating, manipulating, and expressing the nucleic acid sequences that encode all or part of immunoglobulin Fv variable regions from at least one of a heavy or light chain. Sources of such nucleic acid are well known to those skilled in the art and, for example, may be obtained from a hybridoma producing an antibody against a predetermined target, as described above, from germline immunoglobulin genes, or from synthetic constructs. The recombinant DNA encoding the humanized antibody can then be cloned into an appropriate expression vector.

Human germline sequences, for example, are disclosed in Tomlinson, I. A. et al., *J. Mol. Biol.*, 227:776-798 (1992); Cook, G. P. et al., *Immunol. Today*, 16:237-242 (1995); Chothia, D. et al., *J. Mol. Bio.* 227:799-817 (1992); and Tomlinson et al., *EMBO J.*, 14:4628-4638 (1995). The V BASE directory provides a comprehensive directory of human immunoglobulin variable region sequences (compiled by Tomlinson, I. A. et al. MRC Centre for Protein Engineering, Cambridge, UK). These sequences can be used as a source of human sequence, e.g., for framework regions and CDRs. Consensus human framework regions can also be used, e.g., as described in U.S. Pat. No. 6,300,064.

Other methods for humanizing antibodies can also be used. For example, other methods can account for the three dimensional structure of the antibody, framework positions that are in three dimensional proximity to binding determinants, and immunogenic peptide sequences. See, e.g., WO 90/07861; U.S. Pat. Nos. 5,693,762; 5,693,761; 5,585,089; 5,530,101; and 6,407,213; Tempest et al. (1991) *Biotechnology* 9:266-271. Still another method is termed "humaneering" and is described, for example, in U.S. 2005-008625.

The antibody can include a human Fc region, e.g., a wild-type Fc region or an Fc region that includes one or more alterations. In one embodiment, the constant region is altered, e.g., mutated, to modify the properties of the antibody (e.g., to increase or decrease one or more of: Fc receptor binding, antibody glycosylation, the number of cysteine residues, effector cell function, or complement function). For example, the human IgG1 constant region can be mutated at one or more residues, e.g., one or more of residues 234 and 237 (based on Kabat numbering). Antibodies may have mutations in the CH2 region of the heavy chain that reduce or alter effector function, e.g., Fc receptor binding and complement activation. For example, antibodies may have mutations such as those described in U.S. Pat. Nos. 5,624,821 and 5,648,260. Antibodies may also have mutations that stabilize the disulfide bond between the two heavy chains of an immunoglobulin, such as mutations in the hinge region of IgG4, as disclosed in the art (e.g., Angal et al. (1993) *Mol. Immunol.* 30:105-08). See also, e.g., U.S. 2005-0037000.

The anti-PD-1 antibodies can be in the form of full length antibodies, or in the form of low molecular weight forms (e.g., biologically active antibody fragments or minibodies) of the anti-PD-1 antibodies, e.g., Fab, Fab', F(ab')$_2$, Fv, Fd, dAb, scFv, and sc(Fv)2. Other anti-PD-1 antibodies encompassed by this disclosure include single domain antibody (sdAb) containing a single variable chain such as, VH or VL, or a biologically active fragment thereof. See, e.g., Moller et al., *J. Biol. Chem.*, 285(49):38348-38361 (2010); Harmsen et al., *Appl. Microbiol. Biotechnol.*, 77(1):13-22 (2007); U.S. 2005/0079574 and Davies et al. (1996) *Protein Eng.*, 9(6):531-7. Like a whole antibody, a sdAb is able to bind selectively to a specific antigen. With a molecular weight of only 12-15 kDa, sdAbs are much smaller than common antibodies and even smaller than Fab fragments and single-chain variable fragments.

Provided herein are compositions comprising a mixture of an anti-PD-1 antibody or antigen-binding fragment thereof and one or more acidic variants thereof, e.g., wherein the amount of acidic variant(s) is less than about 80%, 70%, 60%, 60%, 50%, 40%, 30%, 30%, 20%, 10%, 5% or 1%. Also provided are compositions comprising an anti-PD-1 antibody or antigen-binding fragment thereof comprising at least one deamidation site, wherein the pH of the composition is from about 5.0 to about 6.5, such that, e.g., at least about 90% of the anti-PD-1 antibodies are not deamidated (i.e., less than about 10% of the antibodies are deamidated). In certain embodiments, less than about 5%, 3%, 2% or 1% of the antibodies are deamidated. The pH may be from 5.0 to 6.0, such as 5.5 or 6.0. In certain embodiments, the pH of the composition is 5.5, 5.6, 5.7, 5.8, 5.9, 6.0, 6.1, 6.2, 6.3, 6.4 or 6.5.

An "acidic variant" is a variant of a polypeptide of interest which is more acidic (e.g. as determined by cation exchange chromatography) than the polypeptide of interest. An example of an acidic variant is a deamidated variant.

A "deamidated" variant of a polypeptide molecule is a polypeptide wherein one or more asparagine residue(s) of the original polypeptide have been converted to aspartate, i.e. the neutral amide side chain has been converted to a residue with an overall acidic character.

The term "mixture" as used herein in reference to a composition comprising an anti-PD-1 antibody or antigen-binding fragment thereof, means the presence of both the desired anti-PD-1 antibody or antigen-binding fragment thereof and one or more acidic variants thereof. The acidic variants may comprise predominantly deamidated anti-PD-1 antibody, with minor amounts of other acidic variant(s).

In certain embodiments, the binding affinity ($K_D$), on-rate ($K_D$ on) and/or off-rate ($K_D$ off) of the antibody that was mutated to eliminate deamidation is similar to that of the wild-type antibody, e.g., having a difference of less than about 5 fold, 2 fold, 1 fold (100%), 50%, 30%, 20%, 10%, 5%, 3%, 2% or 1%.

Antibody Fragments

Antibody fragments (e.g., Fab, Fab', F(ab')2, Facb, and Fv) may be prepared by proteolytic digestion of intact antibodies. For example, antibody fragments can be obtained by treating the whole antibody with an enzyme such as papain, pepsin, or plasmin. Papain digestion of whole antibodies produces F(ab)2 or Fab fragments; pepsin digestion of whole antibodies yields F(ab')2 or Fab'; and plasmin digestion of whole antibodies yields Facb fragments.

Alternatively, antibody fragments can be produced recombinantly. For example, nucleic acids encoding the antibody fragments of interest can be constructed, introduced into an expression vector, and expressed in suitable host cells. See, e.g., Co, M. S. et al., *J. Immunol.*, 152:2968-2976 (1994); Better, M. and Horwitz, A. H., *Methods in Enzymology*, 178:476-496 (1989); Plueckthun, A. and Skerra, A., *Methods in Enzymology*, 178:476-496 (1989); Lamoyi, E., *Methods in Enzymology*, 121:652-663 (1989); Rousseaux, J. et al., *Methods in Enzymology*, (1989) 121: 663-669 (1989); and Bird, R. E. et al., *TIBTECH*, 9:132-137 (1991)). Antibody fragments can be expressed in and secreted from E. coli, thus allowing the facile production of large amounts of these fragments. Antibody fragments can be isolated from the antibody phage libraries. Alternatively, Fab'-SH fragments can be directly recovered from E. coli and chemically coupled to form F(ab)2 fragments (Carter et al., Bio/Technology, 10:163-167 (1992)). According to another approach, F(ab')2 fragments can be isolated directly from recombinant host cell culture. Fab and F(ab')2 fragment with increased in vivo half-life comprising a salvage receptor binding epitope residues are described in U.S. Pat. No. 5,869,046.

Minibodies

Minibodies of anti-PD-1 antibodies include diabodies, single chain (scFv), and single-chain (Fv)2 (sc(Fv)2).

A "diabody" is a bivalent minibody constructed by gene fusion (see, e.g., Holliger, P. et al., Proc. Natl. Acad. Sci. U.S.A., 90:6444-6448 (1993); EP 404,097; WO 93/11161). Diabodies are dimers composed of two polypeptide chains. The VL and VH domain of each polypeptide chain of the diabody are bound by linkers. The number of amino acid residues that constitute a linker can be between 2 to 12 residues (e.g., 3-10 residues or five or about five residues). The linkers of the polypeptides in a diabody are typically too short to allow the VL and VH to bind to each other. Thus, the VL and VH encoded in the same polypeptide chain cannot form a single-chain variable region fragment, but instead form a dimer with a different single-chain variable region fragment. As a result, a diabody has two antigen-binding sites.\

An scFv is a single-chain polypeptide antibody obtained by linking the VH and VL with a linker (see e.g., Huston et al., Proc. Natl. Acad. Sci. U.S.A., 85:5879-5883 (1988); and Plickthun, "The Pharmacology of Monoclonal Antibodies" Vol. 113, Ed Resenburg and Moore, Springer Verlag, New York, pp. 269-315, (1994)). The order of VHs and VLs to be linked is not particularly limited, and they may be arranged in any order. Examples of arrangements include: [VH] linker [VL]; or [VL] linker [VH]. The H chain V region and L chain V region in an scFv may be derived from any anti-PD-1 antibody or antigen-binding fragment thereof described herein.

An sc(Fv)2 is a minibody in which two VHs and two VLs are linked by a linker to form a single chain (Hudson, et al., J. Immunol. Methods, (1999) 231:177-189 (1999)). An sc(Fv)2 can be prepared, for example, by connecting scFvs with a linker. The sc(Fv)2 of the present invention include antibodies preferably in which two VHs and two VLs are arranged in the order of: VH, VL, VH, and VL ([VH] linker [VL] linker [VH] linker [VL]), beginning from the N terminus of a single-chain polypeptide; however the order of the two VHs and two VLs is not limited to the above arrangement, and they may be arranged in any order.

Bispecific Antibodies

Bispecific antibodies are antibodies that have binding specificities for at least two different epitopes. Exemplary bispecific antibodies may bind to two different epitopes of the PD-1 protein. Other such antibodies may combine a PD-1 binding site with a binding site for another protein. Bispecific antibodies can be prepared as full length antibodies or low molecular weight forms thereof (e.g., F(ab')$_2$ bispecific antibodies, sc(Fv)2 bispecific antibodies, diabody bispecific antibodies).

Traditional production of full length bispecific antibodies is based on the co-expression of two immunoglobulin heavy chain-light chain pairs, where the two chains have different specificities (Millstein et al., Nature, 305:537-539 (1983)). In a different approach, antibody variable domains with the desired binding specificities are fused to immunoglobulin constant domain sequences. DNAs encoding the immunoglobulin heavy chain fusions and, if desired, the immunoglobulin light chain, are inserted into separate expression vectors, and are co-transfected into a suitable host cell. This provides for greater flexibility in adjusting the proportions of the three polypeptide fragments. It is, however, possible to insert the coding sequences for two or all three polypeptide chains into a single expression vector when the expression of at least two polypeptide chains in equal ratios results in high yields.

According to another approach described in U.S. Pat. No. 5,731,168, the interface between a pair of antibody molecules can be engineered to maximize the percentage of heterodimers that are recovered from recombinant cell culture. The preferred interface comprises at least a part of the $C_{H3}$ domain. In this method, one or more small amino acid side chains from the interface of the first antibody molecule are replaced with larger side chains (e.g., tyrosine or tryptophan). Compensatory "cavities" of identical or similar size to the large side chain(s) are created on the interface of the second antibody molecule by replacing large amino acid side chains with smaller ones (e.g., alanine or threonine). This provides a mechanism for increasing the yield of the heterodimer over other unwanted end-products such as homodimers.

Bispecific antibodies include cross-linked or "heteroconjugate" antibodies. For example, one of the antibodies in the heteroconjugate can be coupled to avidin, the other to biotin. Heteroconjugate antibodies may be made using any convenient cross-linking methods.

The "diabody" technology provides an alternative mechanism for making bispecific antibody fragments. The fragments comprise a VH connected to a VL by a linker which is too short to allow pairing between the two domains on the same chain. Accordingly, the VH and VL domains of one fragment are forced to pair with the complementary VL and VH domains of another fragment, thereby forming two antigen-binding sites.

Multivalent Antibodies

A multivalent antibody may be internalized (and/or catabolized) faster than a bivalent antibody by a cell expressing an antigen to which the antibodies bind. The antibodies describe herein can be multivalent antibodies with three or more antigen binding sites (e.g., tetravalent antibodies), which can be readily produced by recombinant expression of nucleic acid encoding the polypeptide chains of the antibody. The multivalent antibody can comprise a dimerization domain and three or more antigen binding sites. An exemplary dimerization domain comprises (or consists of) an Fc region or a hinge region. A multivalent antibody can comprise (or consist of) three to about eight (e.g., four) antigen binding sites. The multivalent antibody optionally comprises at least one polypeptide chain (e.g., at least two polypeptide chains), wherein the polypeptide chain(s) comprise two or more variable domains. For instance, the polypeptide chain(s) may comprise VD1-(X1)$_n$-VD2-(X2)$_n$-Fc, wherein VD1 is a first variable domain, VD2 is a second variable domain, Fc is a polypeptide chain of an Fc region, X1 and X2 represent an amino acid or peptide spacer, and n is 0 or 1.

Conjugated Antibodies

The antibodies disclosed herein may be conjugated antibodies which are bound to various molecules including macromolecular substances such as polymers (e.g., polyethylene glycol (PEG), polyethylenimine (PEI) modified with PEG (PEI-PEG), polyglutamic acid (PGA) (N-(2-Hydroxypropyl) methacrylamide (HPMA) copolymers), hyaluronic acid, radioactive materials (e.g. $^{90}$Y, $^{131}$I) fluorescent substances, luminescent substances, haptens, enzymes, metal chelates, drugs, and toxins (e.g., calcheamicin, *Pseudomonas* exotoxin A, ricin (e.g. deglycosylated ricin A chain)).

In one embodiment, to improve the cytotoxic actions of anti-PD-1 antibodies and consequently their therapeutic effectiveness, the antibodies are conjugated with highly toxic substances, including radioisotopes and cytotoxic agents. These conjugates can deliver a toxic load selectively to the target site (i.e., cells expressing the antigen recognized by the antibody) while cells that are not recognized by the antibody are spared. In order to minimize toxicity, conjugates are generally engineered based on molecules with a short serum half-life (thus, the use of murine sequences, and IgG3 or IgG4 isotypes).

In certain embodiments, an anti-PD-1 antibody or antigen-binding fragment thereof are modified with a moiety that improves its stabilization and/or retention in circulation, e.g., in blood, serum, or other tissues, e.g., by at least 1.5, 2, 5, 10, or 50 fold. For example, the anti-PD-1 antibody or antigen-binding fragment thereof can be associated with (e.g., conjugated to) a polymer, e.g., a substantially non-antigenic polymer, such as a polyalkylene oxide or a polyethylene oxide. Suitable polymers will vary substantially by weight. Polymers having molecular number average weights ranging from about 200 to about 35,000 Daltons (or about 1,000 to about 15,000, and 2,000 to about 12,500) can be used. For example, the anti-PD-1 antibody or antigen-binding fragment thereof can be conjugated to a water soluble polymer, e.g., a hydrophilic polyvinyl polymer, e.g., polyvinylalcohol or polyvinylpyrrolidone. Examples of such polymers include polyalkylene oxide homopolymers such as polyethylene glycol (PEG) or polypropylene glycols, polyoxyethylenated polyols, copolymers thereof and block copolymers thereof, provided that the water solubility of the block copolymers is maintained. Additional useful polymers include polyoxyalkylenes such as polyoxyethylene, polyoxypropylene, and block copolymers of polyoxyethylene and polyoxypropylene; polymethacrylates; carbomers; and branched or unbranched polysaccharides.

The above-described conjugated antibodies can be prepared by performing chemical modifications on the antibodies or the lower molecular weight forms thereof described herein. Methods for modifying antibodies are well known in the art (e.g., U.S. Pat. Nos. 5,057,313 and 5,156,840).

Methods of Producing Antibodies

Antibodies may be produced in bacterial or eukaryotic cells. Some antibodies, e.g., Fab's, can be produced in bacterial cells, e.g., *E. coli* cells. Antibodies can also be produced in eukaryotic cells such as transformed cell lines (e.g., CHO, 293E, COS). In addition, antibodies (e.g., scFv's) can be expressed in a yeast cell such as *Pichia* (see, e.g., Powers et al., *J Immunol Methods.* 251:123-35 (2001)), *Hanseula*, or *Saccharomyces*. To produce the antibody of interest, a polynucleotide encoding the antibody is constructed, introduced into an expression vector, and then expressed in suitable host cells. Standard molecular biology techniques are used to prepare the recombinant expression vector, transfect the host cells, select for transformants, culture the host cells and recover the antibody.

If the antibody is to be expressed in bacterial cells (e.g., *E. coli*), the expression vector should have characteristics that permit amplification of the vector in the bacterial cells. Additionally, when *E. coli* such as JM109, DH5α, HB101, or XL1-Blue is used as a host, the vector must have a promoter, for example, a lacZ promoter (Ward et al., 341: 544-546 (1989), araB promoter (Better et al., *Science,* 240:1041-1043 (1988)), or T7 promoter that can allow efficient expression in *E. coli*. Examples of such vectors include, for example, M13-series vectors, pUC-series vectors, pBR322, pBluescript, pCR-Script, pGEX-5X-1 (Pharmacia), "QIAexpress system" (QIAGEN), pEGFP, and pET (when this expression vector is used, the host is preferably BL21 expressing T7 RNA polymerase). The expression vector may contain a signal sequence for antibody secretion. For production into the periplasm of *E. coli*, the pelB signal sequence (Lei et al., *J. Bacteriol.,* 169:4379 (1987)) may be used as the signal sequence for antibody secretion. For bacterial expression, calcium chloride methods or electroporation methods may be used to introduce the expression vector into the bacterial cell.

If the antibody is to be expressed in animal cells such as CHO, COS, and NIH3T3 cells, the expression vector includes a promoter necessary for expression in these cells, for example, an SV40 promoter (Mulligan et al., *Nature,* 277:108 (1979)), MMLV-LTR promoter, EF1α promoter (Mizushima et al., *Nucleic Acids Res.,* 18:5322 (1990)), or CMV promoter. In addition to the nucleic acid sequence encoding the immunoglobulin or domain thereof, the recombinant expression vectors may carry additional sequences, such as sequences that regulate replication of the vector in host cells (e.g., origins of replication) and selectable marker genes. The selectable marker gene facilitates selection of host cells into which the vector has been introduced (see e.g., U.S. Pat. Nos. 4,399,216, 4,634,665 and 5,179,017). For example, typically the selectable marker gene confers resistance to drugs, such as G418, hygromycin, or methotrexate, on a host cell into which the vector has been introduced. Examples of vectors with selectable markers include pMAM, pDR2, pBK-RSV, pBK-CMV, pOPRSV, and pOP13.

In one embodiment, antibodies are produced in mammalian cells. Exemplary mammalian host cells for expressing an antibody include Chinese Hamster Ovary (CHO cells) (including dhfr⁻ CHO cells, described in Urlaub and Chasin (1980) *Proc. Natl. Acad. Sci. USA* 77:4216-4220, used with a DHFR selectable marker, e.g., as described in Kaufman and Sharp (1982) *Mol. Biol.* 159:601-621), human embryonic kidney 293 cells (e.g., 293, 293E, 293T), COS cells, NIH3T3 cells, lymphocytic cell lines, e.g., NS0 myeloma cells and SP2 cells, and a cell from a transgenic animal, e.g., a transgenic mammal. For example, the cell is a mammary epithelial cell.

In an exemplary system for antibody expression, a recombinant expression vector encoding both the antibody heavy chain and the antibody light chain of an anti-PD-1 antibody (e.g., ANTIBODY X) is introduced into dhfr⁻ CHO cells by calcium phosphate-mediated transfection. Within the recombinant expression vector, the antibody heavy and light chain genes are each operatively linked to enhancer/promoter regulatory elements (e.g., derived from SV40, CMV, adenovirus and the like, such as a CMV enhancer/AdMLP promoter regulatory element or an SV40 enhancer/AdMLP promoter regulatory element) to drive high levels of transcription of the genes. The recombinant expression vector also carries a DHFR gene, which allows for selection of CHO cells that have been transfected with the vector using methotrexate selection/amplification. The selected transformant host cells are cultured to allow for expression of the antibody heavy and light chains and the antibody is recovered from the culture medium.

Antibodies can also be produced by a transgenic animal. For example, U.S. Pat. No. 5,849,992 describes a method of expressing an antibody in the mammary gland of a transgenic mammal. A transgene is constructed that includes a milk-specific promoter and nucleic acids encoding the antibody of interest and a signal sequence for secretion. The milk produced by females of such transgenic mammals includes, secreted-therein, the antibody of interest. The antibody can be purified from the milk, or for some applications, used directly. Animals are also provided comprising one or more of the nucleic acids described herein.

The antibodies of the present disclosure can be isolated from inside or outside (such as medium) of the host cell and purified as substantially pure and homogenous antibodies. Methods for isolation and purification commonly used for antibody purification may be used for the isolation and purification of antibodies, and are not limited to any particular method. Antibodies may be isolated and purified by appropriately selecting and combining, for example, column chromatography, filtration, ultrafiltration, salting out, solvent precipitation, solvent extraction, distillation, immunoprecipitation, SDS-polyacrylamide gel electrophoresis, isoelectric focusing, dialysis, and recrystallization. Chromatography includes, for example, affinity chromatography, ion exchange chromatography, hydrophobic chromatography, gel filtration, reverse-phase chromatography, and adsorption chromatography (Strategies for Protein Purification and Characterization: A Laboratory Course Manual. Ed Daniel R. Marshak et al., Cold Spring Harbor Laboratory Press, 1996). Chromatography can be carried out using liquid phase chromatography such as HPLC and FPLC. Columns used for affinity chromatography include protein A column and protein G column. Examples of columns using protein A column include Hyper D, POROS, and Sepharose FF (GE Healthcare Biosciences). The present disclosure also includes antibodies that are highly purified using these purification methods.

Anti-PD-1 Antibodies with Altered Glycosylation

Different glycoforms can profoundly affect the properties of a therapeutic, including pharmacokinetics, pharmacodynamics, receptor-interaction and tissue-specific targeting (Graddis et al., 2002, Curr Pharm Biotechnol. 3:285-297). In particular, for antibodies, the oligosaccharide structure can affect properties relevant to protease resistance, the serum half-life of the antibody mediated by the FcRn receptor, phagocytosis and antibody feedback, in addition to effector functions of the antibody (e.g., binding to the complement complex C1, which induces CDC, and binding to FcγR receptors, which are responsible for modulating the ADCC pathway) (Nose and Wigzell, 1983; Leatherbarrow and Dwek, 1983; Leatherbarrow et al., 1985; Walker et al., 1989; Carter et al., 1992, *PNAS,* 89:4285-4289).

Accordingly, another means of modulating effector function of antibodies includes altering glycosylation of the antibody constant region. Altered glycosylation includes, for example, a decrease or increase in the number of glycosylated residues, a change in the pattern or location of glycosylated residues, as well as a change in sugar structure(s). The oligosaccharides found on human IgGs affects their degree of effector function (Raju, T. S. *BioProcess International* April 2003. 44-53); the microheterogeneity of human IgG oligosaccharides can affect biological functions such as CDC and ADCC, binding to various Fc receptors, and binding to C1q protein (Wright A. & Morrison S L. TIBTECH 1997, 15 26-32; Shields et al. *J. Biol Chem.* 2001 276(9):6591-604; Shields et al. *J Biol Chem.* 2002; 277(30): 26733-40; Shinkawa et al. *J Biol Chem.* 2003 278(5):3466-73; Umana et al. *Nat Biotechnol.* 1999 Feb. 17(2):176-80). For example, the ability of IgG to bind C1q and activate the complement cascade may depend on the presence, absence or modification of the carbohydrate moiety positioned between the two CH2 domains (which is normally anchored at Asn297) (Ward and Ghetie, *Therapeutic Immunology* 2:77-94 (1995).

Glycosylation sites in an Fc-containing polypeptide, for example an antibody such as an IgG antibody, may be identified by standard techniques. The identification of the glycosylation site can be experimental or based on sequence analysis or modeling data. Consensus motifs, that is, the amino acid sequence recognized by various glycosyl transferases, have been described. For example, the consensus motif for an N-linked glycosylation motif is frequently NXT or NXS, where X can be any amino acid except proline. Several algorithms for locating a potential glycosylation motif have also been described. Accordingly, to identify potential glycosylation sites within an antibody or Fc-containing fragment, the sequence of the antibody is examined, for example, by using publicly available databases such as the website provided by the Center for Biological Sequence Analysis (see NetNGlyc services for predicting N-linked glycosylation sites and NetOGlyc services for predicting O-linked glycosylation sites).

In vivo studies have confirmed the reduction in the effector function of aglycosyl antibodies. For example, an aglycosyl anti-CD8 antibody is incapable of depleting CD8-bearing cells in mice (Isaacs, 1992 J. Immunol. 148:3062) and an aglycosyl anti-CD3 antibody does not induce cytokine release syndrome in mice or humans (Boyd, 1995 supra; Friend, 1999 *Transplantation* 68:1632). Aglycosylated forms of the PD-1 antibody also have reduced effector function.

Importantly, while removal of the glycans in the CH2 domain appears to have a significant effect on effector function, other functional and physical properties of the antibody remain unaltered. Specifically, it has been shown that removal of the glycans had little to no effect on serum half-life and binding to antigen (Nose, 1983 supra; Tao, 1989 supra; Dorai, 1991 supra; Hand, 1992 supra; Hobbs, 1992 *Mol. Immunol.* 29:949).

The anti-PD-1 antibodies of the present invention may be modified or altered to elicit increased or decreased effector function(s) (compared to a second PD-1-specific antibody). Methods for altering glycosylation sites of antibodies are described, e.g., in U.S. Pat. Nos. 6,350,861 and 5,714,350, WO 05/18572 and WO 05/03175; these methods can be used to produce anti-PD-1 antibodies of the present invention with altered, reduced, or no glycosylation.

Indications

An anti-PD-1 antibody or antigen-binding fragment thereof described herein can be used to treat or prevent a variety of disorders, including cancer. The cancers that may be treated or prevented by administration of an anti-PD-1 antibody or antigen-binding fragment thereof include: adrenal gland cancer, anal cancer, AIDS-associated cancer, alveolar soft part sarcoma, bladder cancer, bone cancer, brain and spinal cord cancer, breast cancer, carotid body tumor, cervical cancer, chondrosarcoma, chordoma, chromophobe renal cell carcinoma, clear cell carcinoma, colon cancer, colorectal cancer, cutaneous benign fibrous histiocytoma, desmoplastic small round cell tumor, ependymoma, endometrial cancer, Ewing's tumor, extraskeletal myxoid chondrosarcoma, fibrogenesis imperfecta ossium, fibrous dysplasia of the bone, gallbladder or bile duct cancer, gastric cancer, gestational trophoblastic disease, germ cell tumor, head and neck cancer, hepatocellular carcinoma, islet cell tumor, Kaposi's Sarcoma, kidney cancer, leukemia, lipoma/ benign lipomatous tumor, liposarcoma/malignant lipomatous tumor, liver cancer, lymphoma, lung cancer, medulloblastoma, melanoma, meningioma, Merkel cell carcinoma, multiple endocrine neoplasia, multiple myeloma, myelodysplastic syndrome, neuroblastoma, neuroendocrine tumors, ovarian cancer, pancreatic cancer, papillary thyroid carcinoma, parathyroid tumor, pediatric cancer, peripheral nerve sheath tumor, phaeochromocytoma, pituitary tumor, prostate cancer, posterious uveal melanoma, a rare hematologic disorder, renal metastatic cancer, rhabdoid tumor, rhabdomysarcoma, sarcoma, skin cancer, soft-tissue sarcoma, squamous cell cancer, stomach cancer, synovial sarcoma, testicular cancer, thymic carcinoma, thymoma, thyroid metastatic cancer, and uterine cancer.

In particular, an anti-PD-1 antibody or antigen-binding fragment thereof described herein may be used in the treatment of anal cancer, bladder cancer, breast cancer, colorectal cancer, endometrial cancer, hepatocellular carcinoma, glioma, kidney cancer, lung cancer, Merkel cell carcinoma, multiple myeloma, neuroblastoma, non-Hodgkin's lymphoma, non-small cell lung cancer, ovarian cancer, pancreatic cancer, rectal cancer and sarcoma.

In particular, an anti-PD-1 antibody or antigen-binding fragment thereof described herein may be used in the treatment of endometrial cancer (including unselected endometrial cancer, MSI-high endometrial cancer, dMMR endometrial cancer, and/or POLE exonuclease domain mutation positive endometrial cancer), soft tissue sarcoma, non-small cell lung cancer (NSCLC), and cervical cancer.

Squamous Cell Carcinoma of the Anal Canal

Squamous cell carcinoma of the anal canal (SCAC) accounts for almost 3% of digestive system cancers and is increasing in frequency due to its association with HPV and HIV infection. Although most patients have localized disease, systemic metastases will develop in approximately 25% of patients, and 5-year survival is poor in these individuals. Salvage chemotherapy with platinum-based regimens is an accepted standard of care; however, responses are not durable, and progression-free and overall survival after these treatments is measured only in months. There are no accepted salvage treatments for patients who progress after first-line chemotherapy.

Merkel Cell Carcinoma

Merkel cell carcinoma is a rare, aggressive, cutaneous malignancy attributed to multiple factors, such as Merkel cell polyomavirus, UV irradiation, and immunosuppression. This disease typically is found in older adults with light skin types and has a poor prognosis with lower survival rates compared with other skin malignancies. Surgery and/or radiation therapy are indicated and potentially curative for local-regional disease, and relapse is common.

The 5-year survival rates for patients with MCC are 75%, 59%, and 25% for primary localized tumors, tumors with regional lymph node metastases (or local recurrences), and tumors with distant metastases, respectively. More than 30% of patients will develop distant metastatic disease, and the 5-year survival rate for these patients is only approximately 10%.

Historically, metastatic MCC has been treated with chemotherapy regimens similar to those used for small cell lung cancer. Platinum-based chemotherapy provides high initial response rates that are of short duration. No survival advantage has ever been demonstrated for chemotherapy in this disease. Chemotherapy is also associated with risk of severe toxicity and toxic death, particularly among older patients.

Endometrial Cancer

Endometrial cancer is the fourth most common cancer to affect American women with an estimate of 60,050 new cases diagnosed; an estimated 10,470 endometrial cancer related deaths will occur, making it the sixth most common cancer related deaths to affect American women. Globally, it is the fourth most common cause of cancer related death among women. Endometrial cancer is the most common gynecologic malignancy to afflict women, with adenocarcinoma being the most common histology. Cancers diagnosed at an early stage offer good prognosis with curative options of surgery and/or radiation, but aggressive late stage cancers have limited curative therapeutic options, with five year survivals ranging from 20-60%. Standard treatments for locally advanced or metastatic cancers include systemic treatments like hormonal therapy, single agent chemotherapy, such as doxorubicin, or platinum based combination chemotherapy regimens, such as carboplatin and docetaxel. Given the poor long term prognosis for these patients, additional and newer treatments are necessary.

Pharmaceutical Compositions

An anti-PD-1 antibody or antigen-binding fragment thereof described herein can be formulated as a pharmaceutical composition for administration to a subject, e.g., to treat a disorder described herein. Typically, a pharmaceutical composition includes a pharmaceutically acceptable carrier. As used herein, "pharmaceutically acceptable carrier" includes any and all solvents, dispersion media, coatings, antibacterial and antifungal agents, isotonic and absorption delaying agents, and the like that are physiologically compatible. The composition can include a pharmaceutically acceptable salt, e.g., an acid addition salt or a base addition salt (see e.g., Berge, S. M., et al. (1977) *J. Pharm. Sci.* 66:1-19).

Pharmaceutical formulation is a well-established art, and is further described, e.g., in Gennaro (ed.), *Remington: The Science and Practice of Pharmacy*, 20$^{th}$ ed., Lippincott, Williams & Wilkins (2000) (ISBN: 0683306472); Ansel et al., *Pharmaceutical Dosage Forms and Drug Delivery Systems*, 7$^{th}$ Ed., Lippincott Williams & Wilkins Publishers (1999) (ISBN: 0683305727); and Kibbe (ed.), *Handbook of Pharmaceutical Excipients American Pharmaceutical Association*, 3rd ed. (2000) (ISBN: 091733096X).

The pharmaceutical compositions may be in a variety of forms. These include, for example, liquid, semi-solid and solid dosage forms, such as liquid solutions (e.g., injectable and infusible solutions), dispersions or suspensions, tablets, pills, powders, liposomes and suppositories. The preferred form can depend on the intended mode of administration and therapeutic application. Typically compositions for the agents described herein are in the form of injectable or infusible solutions.

The composition can be formulated as a solution, microemulsion, dispersion, liposome, or other ordered structure suitable for stable storage at high concentration. Sterile injectable solutions can be prepared by incorporating an agent described herein in the required amount in an appropriate solvent with one or a combination of ingredients enumerated above, as required, followed by filtered sterilization. Generally, dispersions are prepared by incorporating an agent described herein into a sterile vehicle that contains a basic dispersion medium and the required other ingredients from those enumerated above. In the case of sterile powders for the preparation of sterile injectable solutions, the preferred methods of preparation are vacuum drying and freeze drying that yield a powder of an agent described herein plus any additional desired ingredient from a previously sterile-filtered solution thereof. The proper fluidity of a solution can be maintained, for example, by the use of a coating such as lecithin, by the maintenance of the required particle size in the case of dispersion and by the use of surfactants. Prolonged absorption of injectable compositions can be brought about by including in the composition an agent that delays absorption, for example, monostearate salts and gelatin.

In certain embodiments, the anti-PD-1 antibody or antigen-binding fragment thereof may be prepared with a carrier that will protect the compound against rapid release, such as a controlled release formulation, including implants, and microencapsulated delivery systems. Biodegradable, biocompatible polymers can be used, such as ethylene vinyl acetate, polyanhydrides, polyglycolic acid, collagen, polyorthoesters, and polylactic acid. Many methods for the preparation of such formulations are patented or generally known. See, e.g., *Sustained and Controlled Release Drug Delivery Systems*, J. R. Robinson, ed., Marcel Dekker, Inc., New York (1978).

Administration

The anti-PD-1 antibody or antigen-binding fragment thereof can be administered to a subject, e.g., a subject in need thereof, for example, a human subject, by a variety of methods. For many applications, the route of administration is one of: intravenous injection or infusion (IV), subcutaneous injection (SC), intraperitoneally (IP), or intramuscular injection. It is also possible to use intra-articular delivery. Other modes of parenteral administration can also be used. Examples of such modes include: intraarterial, intrathecal, intracapsular, intraorbital, intracardiac, intradermal, transtracheal, subcuticular, intraarticular, subcapsular, subarachnoid, intraspinal, and epidural and intrasternal injection. In some cases, administration can be oral.

The route and/or mode of administration of the antibody or antigen-binding fragment thereof can also be tailored for the individual case, e.g., by monitoring the subject, e.g., using tomographic imaging, e.g., to visualize a tumor.

The antibody or antigen-binding fragment thereof can be administered as a fixed dose, or in a mg/kg patient weight close. The dose can also be chosen to reduce or avoid production of antibodies against the anti-PD-1 antibody. Dosage regimens are adjusted to provide the desired response, e.g., a therapeutic response or a combinatorial therapeutic effect. Generally, doses of the anti-PD-1 antibody (and optionally a second agent) can be used in order to provide a subject with the agent in bioavailable quantities. For example, closes in the range of about 0.1-100 mg/kg, about 0.5-100 mg/kg, about 1 mg/kg-100 mg/kg, about 0.5-20 mg/kg, about 0.1-10 mg/kg, or about 1-10 mg/kg can be administered. Other closes can also be used. In specific embodiments, a subject in need of treatment with an anti-PD-1 antibody is administered the antibody at a dose of about 1 mg/kg, about 2 mg/kg, about 3 mg/kg, about 4 mg/kg, about 5 mg/kg, about 10 mg/kg, about 15 mg/kg, about 20 mg/kg, about 30 mg/kg, about 35 mg/kg, or about 40 mg/kg. With respect to closes or dosages, the term "about" is intended to denote a range that is ±10% of a recited close, such that, for example, a dose of about 3 mg/kg will be between 2.7 mg/kg and 3.3 mg/kg patient weight.

A composition may comprise about 1 mg/mL to 100 mg/ml or about 10 mg/mL to 100 mg/ml or about 50 to 250 mg/mL or about 100 to 150 mg/ml or about 100 to 250 mg/ml of anti-PD-1 antibody or antigen-binding fragment thereof.

Dosage unit form or "fixed dose" or "flat close" as used herein refers to physically discrete units suited as unitary dosages for the subjects to be treated; each unit contains a predetermined quantity of active compound calculated to produce the desired therapeutic effect in association with the required pharmaceutical carrier and optionally in association with the other agent. Single or multiple dosages may be given. Alternatively, or in addition, the antibody may be administered via continuous infusion. Exemplary fixed doses include about 375 mg, about 500 mg and about 750 mg. In some embodiments, with respect to closes or dosages, the term "about" is intended to denote a range that is ±10% of a recited close, such that, for example, a dose of about 375 mg will be between 337.5 mg and 412.5 mg.

An anti-PD-1 antibody or antigen-binding fragment thereof dose can be administered, e.g., at a periodic interval over a period of time (a course of treatment) sufficient to encompass at least 2 closes, 3 closes, 5 closes, 10 closes, or more, e.g., once or twice daily, or about one to four times per week, or preferably weekly, biweekly (every two weeks), every three weeks, monthly, e.g., for between about 1 to 12 weeks, preferably between 2 to 8 weeks, more preferably between about 3 to 7 weeks, and even more preferably for about 4, 5, or 6 weeks. Factors that may influence the dosage and timing required to effectively treat a subject, include, e.g., the severity of the disease or disorder, formulation, route of delivery, previous treatments, the general health and/or age of the subject, and other diseases present. Moreover, treatment of a subject with a therapeutically effective amount of a compound can include a single treatment or, preferably, can include a series of treatments.

An exemplary closing regimen comprises administration of an anti-PD-1 antibody or antigen-binding fragment thereof at a fixed dose of about 375 mg once every 3 weeks. Another exemplary closing regimen comprises administration of an anti-PD-1 antibody or antigen-binding fragment thereof at a fixed dose of about 500 mg once every 4 weeks. Still another exemplary closing regimen comprises administration of an anti-PD-1 antibody or antigen-binding fragment thereof at a fixed dose of about 750 mg once every 4 weeks.

An exemplary weight-based closing regimen comprises administration of an anti-PD-1 antibody or antigen-binding fragment thereof at a dosage of about 1 mg/kg once every 2 weeks. Another exemplary weight-based closing regimen comprises administration of an anti-PD-1 antibody or antigen-binding fragment thereof at a dosage of about 3 mg/kg once every 2 weeks. Another exemplary weight-based closing regimen comprises administration of an anti-PD-1 antibody or antigen-binding fragment thereof at a dosage of about 3 mg/kg once every 4 weeks. Another exemplary weight-based closing regimen comprises administration of an anti-PD-1 antibody or antigen-binding fragment thereof at a dosage of about 10 mg/kg once every 2 weeks. Another exemplary weight-based closing regimen comprises administration of an anti-PD-1 antibody or antigen-binding fragment thereof at a dosage of about 10 mg/kg once every 4 weeks.

A pharmaceutical composition may include a "therapeutically effective amount" of an agent described herein. Such effective amounts can be determined based on the effect of the administered agent, or the combinatorial effect of agents if more than one agent is used. A therapeutically effective amount of an agent may also vary according to factors such as the disease state, age, sex, and weight of the individual, and the ability of the compound to elicit a desired response in the individual, e.g., amelioration of at least one disorder parameter or amelioration of at least one symptom of the disorder. A therapeutically effective amount is also one in which any toxic or detrimental effects of the composition are outweighed by the therapeutically beneficial effects.

The following are examples of the practice of the invention. They are not to be construed as limiting the scope of the invention in any way.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art can develop equivalent means or reactants without the exercise of inventive capacity and without departing from the scope of the invention.

Example 1: A Phase 2 Study of ANTIBODY X in Participants with Squamous Carcinoma of the Anal Canal (SCAC) who have Progressed Following Platinum-Based Chemotherapy This is an open-label, single-group, multicenter, Phase 2 study for participants with locally advanced or metastatic SCAC who have progressed on a standard-of-care platinum-based chemotherapy regimen. Participants with well-controlled HIV infection are eligible. All participants receive ANTIBODY X at the recommended Phase 2 dose of 500 mg IV Q4W. The primary endpoint is ORR as determined by independent central review using RECIST v1.1.

The study consists of 3 periods: screening, study drug treatment, and follow-up. Treatment may continue for up to 2 years in the absence of clinical disease progression, intolerable toxicity, death, withdrawal of consent, lost to follow-up, or premature discontinuation for any other reason.

Participants who achieve a CR may discontinue ANTIBODY X after 2 additional cycles upon consultation with the medical monitor.

Treatment is administered by IV infusion over 60 minutes on Day 1 of each 28-day cycle. Subsequent treatment cycles should be delayed (for up to 12 weeks) until the following criteria are met:

Hemoglobin≥8 gm/dL.
ANC≥1.0×109/L.
Platelet count≥75×109/L.
ALT/AST/bilirubin≤Grade 2.
Resolution of all immune-related toxicity to ≤Grade 1 (with the exception of endocrinopathy that is controlled on hormonal replacement), other than unacceptable toxicity.
Resolution of all non-immune-related toxicity to Grade ≤1 or baseline (with the exception of alopecia or non-transfusion-dependent anemia). Transient asymptomatic laboratory elevations ≤Grade 3 do not require close interruption or reduction if the participant is asymptomatic and the elevation is clinically insignificant and has been discussed with the medical monitor (e.g., amylase, lipase).
Daily dose of corticosteroid ≤10 mg prednisone or equivalent.

The follow-up period begins once a participant has completed 2 years of study drug or prematurely discontinued from study drug. Participants are evaluated for AEs for 90 days after the last dose of study drug, or until the start of another anticancer therapy, whichever occurs first.

Once participants discontinue treatment, they enter the follow-up period and are assessed for survival until study completion. Participants who discontinue study treatment without experiencing disease progression will enter the follow-up period and continue to undergo tumor assessments according to the schedule of activities until they experience disease progression, the start of a new anticancer treatment, withdrawal of consent, lost to follow-up, the end of the study, or death.

Dose modifications of ANTIBODY X are allowed for AEs. Before the start of each treatment cycle, the participant must meet the treatment continuation criteria before administration of ANTIBODY X. If the criteria are not met at the beginning of a treatment cycle, ANTIBODY X infusion may be delayed up to 12 weeks to allow for resolution of any abnormal laboratory results or AEs. Participants should be withdrawn from the active treatment portion of the study if re-treatment criteria are not met within 12 weeks of the scheduled start of a cycle. Upon resolution, participants may resume treatment if no medical condition or other circumstance exists that, in the opinion of the investigator, would make the participant unsuitable for further participation in the study. If ANTIBODY X must be discontinued due to unacceptable toxicity, then the participant should be withdrawn from active treatment and enter the follow-up period of the study.

Example 2: A Phase 2 Study of ANTIBODY X in Participants With Metastatic Merkel Cell Carcinoma (MCC)

This is a Phase 2, open-label, single-arm, multicenter study designed to assess the clinical activity and safety of ANTIBODY X in participants with metastatic MCC. This study will enroll participants with metastatic MCC, including those who are chemotherapy-naive as well as those who have received prior chemotherapy who otherwise meet all eligibility criteria. All participants must submit tissue samples (fresh or archival) for central pathology review. Participants who do not have MCC confirmed by pathology may remain on study treatment but will be replaced for efficacy analysis.

All participants who meet the eligibility criteria during screening will receive treatment with ANTIBODY X. The primary endpoint is ORR as determined by ICR according to RECIST v1.1.

Study treatment will consist of monotherapy ANTIBODY X administered at the recommended Phase 2 dose of 500 mg by IV infusion once every 28 days. Treatment with study drug may continue up to 2 years in the absence of clinical disease progression, intolerable toxicity, death, withdrawal of consent, lost to follow-up, or premature discontinuation for any other reason.

The study consists of 3 periods: screening, study drug treatment, and follow-up.

Eligible participants will receive treatment with single-agent ANTIBODY X 500 mg administered by IV infusion over 60 minutes on Day 1 of each 28-day cycle. Pretreatment criteria that must be met each cycle include the following:

Hemoglobin≥8 g/dL
ANC≥1.0×109/L
Platelet count≥75×109/L
ALT/AST/bilirubin≤Grade 2
Resolution of all immune-related toxicity to ≤Grade 1 (with the exception of endocrinopathy that is controlled on hormonal replacement)
Resolution of all non-immune-related toxicity to ≤Grade 1 or baseline (with the exception of alopecia or non-transfusion-dependent anemia). Transient asymptomatic laboratory elevations ≤Grade 3 do not require close interruption or reduction if the participant is asymptomatic, and if the elevation is clinically insignificant and has been discussed with the medical monitor.

The follow-up period begins once a participant has completed or prematurely discontinued the study treatment. Participants are evaluated for AEs and other safety parameters for up to 90 days after the last dose of study treatment.

Once a participant discontinues treatment they enter the follow-up period and will be assessed for survival until study completion. Participants who discontinue study treatment without experiencing disease progression will enter the follow-up period and continue to undergo tumor assessments according to the schedule of activities until they experience disease progression, the start of a new anticancer treatment, withdrawal of consent, lost to follow-up, the end of the study, or death.

Dose modifications of ANTIBODY X are allowed for AEs. Before the start of each treatment cycle, the participant must meet the treatment continuation criteria before administration of ANTIBODY X. If the criteria are not met at the beginning of a treatment cycle, ANTIBODY X infusion may be delayed up to 12 weeks to allow for resolution of any abnormal laboratory results or AEs. Participants should be withdrawn from the active treatment portion of the study if re-treatment criteria are not met within 12 weeks of the scheduled start of a cycle. Upon resolution, participants may resume treatment if no medical condition or other circumstance exists that, in the opinion of the investigator, would make the participant unsuitable for further participation in the study. If ANTIBODY X must be discontinued due to unacceptable toxicity, then the participant should be withdrawn from active treatment and enter the follow-up period of the study.

Example 3: A Phase 1 Study of the Safety, Tolerability, and Pharmacokinetics of ANTIBODY X in Patients with Endometrial Cancer This study is a Phase 1, open-label, close escalation, and cohort expansion study designed to characterize the safety, tolerability, PK, PD, immunogenicity, and preliminary antitumor activity of ANTIBODY X administered IV every two or four weeks in patients with relapsed/refractory, unresectable locally advanced or metastatic solid tumors.

The study consists of two phases, a Dose Escalation Phase followed by a Cohort Expansion Phase.

For all patients enrolled in the study, ANTIBODY X is administered as an IV infusion over 60 minutes. For purposes of defining a treatment interval for the duration of this study, one cycle is defined as 28 days or four (4) weeks. Two schedules of ANTIBODY X administration will be explored in Dose Escalation and Expansion Phases: once every two weeks (Q2W) or once every four weeks (Q4W); in addition, a flat/fixed closing schedule of ANTIBODY X (Q4W) will be explored only in the Expansion Phase. For both the Dose Escalation and Cohort Expansion Phases, patients' tumor assessments will be obtained every two cycles (8 weeks) for the first six cycles (24 weeks) and then every three cycles (12 weeks) thereafter until the end of treatment visit; these scans may be performed within 7 days prior to the end of the respective cycles. Assuming the patient remains clinically stable, has not experienced immune-related progressive disease (irPD), and does not experience unacceptable toxicity that necessitates permanent discontinuation of the study drug, treatment with ANTIBODY X may continue for up to 24 cycles (~2 years). Following the last dose of study drug, all patients will be followed for safety evaluation for a 30-day Safety Follow-up period and for survival assessment every 6 months during a 2-year Survival Follow-up period.

Within the endometrial cancer cohort, a minimum of 10 patients with microsatellite instability-high (MSI-H), mismatch repair deficient (dMMR), and/or DNA polymerase ε (POLE) exonuclease domain mutation positive disease are enrolled.

Patients receive 3 mg/kg ANTIBODY X once every 2 or 4 weeks (or 1 mg/kg Q2W or 10 mg/kg Q2W or 10 mg/kg Q4W) at the closes established for that schedule from the Dose Escalation Phase of the study. Patients in the flat/fixed-close cohorts receive ANTIBODY X at either 500 mg Q4W or 750 mg Q4W.

Example 4: A Phase 1 Study of the Safety, Tolerability, and Pharmacokinetics of ANTIBODY X in Patients with Cancer This study is a Phase 1, open-label, close escalation, and cohort expansion study designed to characterize the safety, tolerability, PK, PD, immunogenicity, and preliminary antitumor activity of ANTIBODY X administered IV every two, three, or four weeks in patients with relapsed/refractory, unresectable locally advanced or metastatic solid tumors.

The study consists of two phases, a Dose Escalation Phase followed by a Cohort Expansion Phase.

For all patients enrolled in the study, ANTIBODY X is administered as an IV infusion over 60 minutes. For purposes of defining a treatment interval for the duration of this study, 1 cycle is defined as 28 days or 4 weeks for patients receiving Q2W or Q4W closes. For patients receiving Q3W closes, 1 cycle is defined as 21 days or 3 weeks. For both the Dose Escalation and Cohort Expansion Phases, tumor assessments will be obtained every 8 weeks for the first 24 weeks for patients receiving Q2W or Q4W closes and every 9 weeks for the first 27 weeks for patients receiving Q3W closes and then every 12 weeks thereafter until the end of treatment visit; these scans may be performed within 7 days prior to the end of the respective cycles. Assuming the patient remains clinically stable, has not experienced clinical progression, and does not experience unacceptable toxicity that necessitates permanent discontinuation of the study drug, treatment with ANTIBODY X may continue for up to 2 years. Following the last dose of study drug, all patients will be followed for safety evaluation for a 30-day Safety Follow-up period and for survival assessment every 6 months during a 2-year Survival Follow-up period.

In the Dose Escalation Phase ANTIBODY X will be evaluated in sequential escalating closes. Dose levels of ANTIBODY X to be evaluated include 1 mg/kg, 3 mg/kg, and 10 mg/kg at intervals of once every two weeks (Q2W) or once every four weeks (Q4W). For example patients may receive ANTIBODY X at 1 mg/kg Q2W, 3 mg/kg Q2W, 3 mg/kg Q4W, 10 mg/kg Q2W, or 10 mg/kg Q4W at the closes established for that schedule from the Dose Escalation Phase of the study.

The Cohort Expansion Phase will include tumor-specific cohorts including patients with endometrial cancer (unselected, MSI-high and dMMR), soft tissue sarcoma, non-small cell lung cancer, cervical cancer, and cohorts of any tumor histology (tumor-agnostic). Dose levels of ANTIBODY X to be evaluated include 3 mg/kg once every two weeks, for example 3 mg/kg Q2W, and flat/fixed closing of ANTIBODY X at 375 mg, 500 mg and 750 mg once every three weeks or four weeks, for example 375 mg Q3W, 500 mg Q4W, or 750 mg Q4W.

OTHER EMBODIMENTS

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

---

What is claimed is:

1. A method of treating Merkel cell carcinoma in a human subject in need thereof, the method comprising administering to the human subject a therapeutically effective amount of an antibody that binds to human PD-1, wherein the antibody comprises a heavy chain and a light chain, wherein the heavy chain comprises the amino acid sequence set forth in SEQ ID NO:2 and the light chain comprises the amino acid sequence set forth in SEQ ID NO:3,
   and wherein the antibody is administered at a dose of 500 mg once every four weeks.

2. The method of claim 1, wherein the antibody is administered intravenously.

3. The method of claim 1, wherein the antibody is administered via continuous infusion.

4. The method of claim 1, wherein the antibody is administered to the subject in a composition that comprises about 1 mg/mL to 100 mg/ml or about 10 mg/mL to 100 mg/ml or about 50 to 250 mg/mL or about 100 to 150 mg/ml or about 100 to 250 mg/ml of anti-PD-1 antibody.

5. The method of claim 1, wherein the antibody is produced in mammalian cells.

6. The method of claim 5, wherein the antibody is produced in Chinese Hamster Ovary (CHO) cells.

* * * * *

SEQUENCE LISTING

```
<160> NUMBER OF SEQ ID NOS: 11

<210> SEQ ID NO 1
<211> LENGTH: 288
<212> TYPE: PRT
<213> ORGANISM: Homo sapiens

<400> SEQUENCE: 1

Met Gln Ile Pro Gln Ala Pro Trp Pro Val Val Trp Ala Val Leu Gln
1               5                   10                  15

Leu Gly Trp Arg Pro Gly Trp Phe Leu Asp Ser Pro Asp Arg Pro Trp
            20                  25                  30

Asn Pro Pro Thr Phe Ser Pro Ala Leu Leu Val Val Thr Glu Gly Asp
        35                  40                  45

Asn Ala Thr Phe Thr Cys Ser Phe Ser Asn Thr Ser Glu Ser Phe Val
    50                  55                  60

Leu Asn Trp Tyr Arg Met Ser Pro Ser Asn Gln Thr Asp Lys Leu Ala
65                  70                  75                  80

Ala Phe Pro Glu Asp Arg Ser Gln Pro Gly Gln Asp Cys Arg Phe Arg
                85                  90                  95

Val Thr Gln Leu Pro Asn Gly Arg Asp Phe His Met Ser Val Val Arg
            100                 105                 110

Ala Arg Arg Asn Asp Ser Gly Thr Tyr Leu Cys Gly Ala Ile Ser Leu
        115                 120                 125

Ala Pro Lys Ala Gln Ile Lys Glu Ser Leu Arg Ala Glu Leu Arg Val
    130                 135                 140

Thr Glu Arg Arg Ala Glu Val Pro Thr Ala His Pro Ser Pro Ser Pro
145                 150                 155                 160

Arg Pro Ala Gly Gln Phe Gln Thr Leu Val Val Gly Val Val Gly Gly
                165                 170                 175

Leu Leu Gly Ser Leu Val Leu Leu Val Trp Val Leu Ala Val Ile Cys
            180                 185                 190

Ser Arg Ala Ala Arg Gly Thr Ile Gly Ala Arg Arg Thr Gly Gln Pro
        195                 200                 205

Leu Lys Glu Asp Pro Ser Ala Val Pro Val Phe Ser Val Asp Tyr Gly
    210                 215                 220

Glu Leu Asp Phe Gln Trp Arg Glu Lys Thr Pro Glu Pro Pro Val Pro
225                 230                 235                 240

Cys Val Pro Glu Gln Thr Glu Tyr Ala Thr Ile Val Phe Pro Ser Gly
                245                 250                 255

Met Gly Thr Ser Ser Pro Ala Arg Arg Gly Ser Ala Asp Gly Pro Arg
            260                 265                 270

Ser Ala Gln Pro Leu Arg Pro Glu Asp Gly His Cys Ser Trp Pro Leu
        275                 280                 285

<210> SEQ ID NO 2
<211> LENGTH: 445
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
```

<400> SEQUENCE: 2

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Tyr
            20                  25                  30

Trp Met Asn Trp Val Arg Gln Ala Pro Gly Gln Gly Leu Glu Trp Ile
        35                  40                  45

Gly Val Ile His Pro Ser Asp Ser Glu Thr Trp Leu Asp Gln Lys Phe
    50                  55                  60

Lys Asp Arg Val Thr Ile Thr Val Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu His Tyr Gly Thr Ser Pro Phe Ala Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Lys Thr Tyr Thr Cys Asn Val Asp His Lys Pro
        195                 200                 205

Ser Asn Thr Lys Val Asp Lys Arg Val Glu Ser Lys Tyr Gly Pro Pro
    210                 215                 220

Cys Pro Pro Cys Pro Ala Pro Glu Phe Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Phe Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Gln Glu Glu Met Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Arg Leu Thr Val Asp Lys Ser Arg Trp

```
                    405                 410                 415

Gln Glu Gly Asn Val Phe Ser Cys Ser Val Met His Glu Ala Leu His
            420                 425                 430

Asn His Tyr Thr Gln Lys Ser Leu Ser Leu Ser Leu Gly
            435                 440                 445

<210> SEQ ID NO 3
<211> LENGTH: 218
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 3

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Glu Ser Val Asp Asn Tyr
            20                  25                  30

Gly Met Ser Phe Met Asn Trp Phe Gln Gln Lys Pro Gly Gln Pro Pro
        35                  40                  45

Lys Leu Leu Ile His Ala Ala Ser Asn Gln Gly Ser Gly Val Pro Ser
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Phe Cys Gln Gln Ser Lys
                85                  90                  95

Glu Val Pro Tyr Thr Phe Gly Gly Gly Thr Lys Val Glu Ile Lys Arg
            100                 105                 110

Thr Val Ala Ala Pro Ser Val Phe Ile Phe Pro Pro Ser Asp Glu Gln
        115                 120                 125

Leu Lys Ser Gly Thr Ala Ser Val Val Cys Leu Leu Asn Asn Phe Tyr
    130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215

<210> SEQ ID NO 4
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 4

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Tyr
            20                  25                  30
```

```
Trp Met Asn Trp Val Arg Gln Ala Pro Gly Gln Gly Leu Glu Trp Ile
        35                  40                  45

Gly Val Ile His Pro Ser Asp Ser Glu Thr Trp Leu Asp Gln Lys Phe
    50                  55                  60

Lys Asp Arg Val Thr Ile Thr Val Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Glu His Tyr Gly Thr Ser Pro Phe Ala Tyr Trp Gly Gln Gly
            100                 105                 110

Thr Leu Val Thr Val Ser Ser
            115

<210> SEQ ID NO 5
<211> LENGTH: 111
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Glu Ser Val Asp Asn Tyr
            20                  25                  30

Gly Met Ser Phe Met Asn Trp Phe Gln Gln Lys Pro Gly Gln Pro Pro
        35                  40                  45

Lys Leu Leu Ile His Ala Ala Ser Asn Gln Gly Ser Gly Val Pro Ser
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Phe Cys Gln Gln Ser Lys
                85                  90                  95

Glu Val Pro Tyr Thr Phe Gly Gly Gly Thr Lys Val Glu Ile Lys
            100                 105                 110

<210> SEQ ID NO 6
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Ser Tyr Trp Met Asn
1               5

<210> SEQ ID NO 7
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 7
```

```
Val Ile His Pro Ser Asp Ser Glu Thr Trp Leu Asp Gln Lys Phe Lys
1               5                   10                  15
Asp

<210> SEQ ID NO 8
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 8

Glu His Tyr Gly Thr Ser Pro Phe Ala Tyr
1               5                   10

<210> SEQ ID NO 9
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 9

Arg Ala Ser Glu Ser Val Asp Asn Tyr Gly Met Ser Phe Met Asn Trp
1               5                   10                  15

<210> SEQ ID NO 10
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 10

Ala Ala Ser Asn Gln Gly Ser
1               5

<210> SEQ ID NO 11
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Gln Gln Ser Lys Glu Val Pro Tyr Thr
1               5
```